(12) United States Patent
Kim et al.

(10) Patent No.: US 12,722,283 B2
(45) Date of Patent: Sep. 1, 2026

(54) GRIPPER

(71) Applicants: Hyundai Motor Company, Seoul (KR); Kia Corporation, Seoul (KR)

(72) Inventors: Beom Su Kim, Yongin-si (KR); Hyun Seop Lim, Anyang-si (KR); Ju Young Yoon, Suwon-si (KR); Kyu Jung Kim, Seoul (KR); Hyo-Joong Kim, Suwon-si (KR); Seong Taek Hwang, Suwon-si (KR); Ho Jun Kim, Gunpo-si (KR); Dong Jin Hyun, Suwon-si (KR); Min Woong Jeung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 879 days.

(21) Appl. No.: 18/164,953

(22) Filed: Feb. 6, 2023

(65) Prior Publication Data

US 2024/0100690 A1 Mar. 28, 2024

(30) Foreign Application Priority Data

Sep. 28, 2022 (KR) ........................ 10-2022-0123598

(51) Int. Cl.
*B25J 15/10* (2006.01)
*B25J 9/10* (2006.01)
(Continued)

(52) U.S. Cl.
CPC ........... *B25J 9/102* (2013.01); *B25J 15/0028* (2013.01); *B25J 15/086* (2013.01); *B25J 15/103* (2013.01);
(Continued)

(58) Field of Classification Search
CPC ...... B25J 9/102; B25J 15/0028; B25J 15/086; B25J 15/103; B25J 15/0253;
(Continued)

(56) References Cited

U.S. PATENT DOCUMENTS 8,801,063 B2 8/2014 Nammoto et al.
9,016,742 B2 4/2015 Nammoto et al.
(Continued)

FOREIGN PATENT DOCUMENTS

CN 108908392 A * 11/2018 .............. B25J 19/00
JP 2013146798 A 8/2013
(Continued)

OTHER PUBLICATIONS

Robot Hand; Patent No. 7194946; Document ID: JP 7194946 B2; Date Published: Dec. 23, 2022; Inventor: Kazuhiro Kosuge; Application No. JP 2020161488 A; Date Filed: Sep. 25, 2020 (Year: 2022).*

*Primary Examiner* — Mahdi H Nejad
(74) *Attorney, Agent, or Firm* — Slater Matsil, LLP

(57) ABSTRACT

A gripper includes a body part, a finger base part coupled to the body part to be rotatable, the finger base part including a first finger base part and a second finger base part configured such that when the first finger base part is rotated in a first direction with respect to the body part, the second finger base part is provided to be rotatable in a second direction opposite the first direction with respect to the body part, and a finger part coupled to a first side of the body part or the finger base part to be reciprocal.

20 Claims, 14 Drawing Sheets

(51) Int. Cl.

| | |
|---|---|
| ***B25J 15/00*** | (2006.01) |
| ***B25J 15/08*** | (2006.01) |
| *B25J 9/16* | (2006.01) |

(52) U.S. Cl.
CPC .............. *B25J 9/1612* (2013.01); *B25J 15/08* (2013.01); *Y10S 901/31* (2013.01)

(58) Field of Classification Search
CPC ...... B25J 15/0213; B25J 15/022; B25J 15/10; B25J 15/0009; B25J 15/08; B25J 13/082; B25J 9/0087; Y10S 901/31
USPC ............................................ 294/106; 901/31
See application file for complete search history.

(56) References Cited

U.S. PATENT DOCUMENTS

| | | | | |
|---|---|---|---|---|
| 9,089,976 | B2 | 7/2015 | Dan et al. | |
| 9,782,902 | B1 | 10/2017 | Kim et al. | |
| 9,844,885 | B2 * | 12/2017 | Wong | B25J 15/0028 |
| 10,259,122 | B2 | 4/2019 | Odhner et al. | |
| 2013/0183129 | A1 * | 7/2013 | Nammoto | B25J 9/00 901/31 |
| 2014/0103673 | A1 * | 4/2014 | Nammoto | B25J 11/00 264/259 |
| 2015/0202778 | A1 | 7/2015 | Nammoto et al. | |
| 2022/0362949 | A1 | 11/2022 | Kim et al. | |
| 2022/0379496 | A1 | 12/2022 | Choi et al. | |
| 2023/0339704 | A1 * | 10/2023 | Fujisawa | B65G 29/00 |

FOREIGN PATENT DOCUMENTS

| | | | | |
|---|---|---|---|---|
| JP | 2014076524 | A | 5/2014 | |
| JP | 2016068192 | A | 5/2016 | |
| JP | 2019063886 | A | 4/2019 | |
| JP | 2020026016 | A | 2/2020 | |
| KR | 101167238 | B1 | 7/2012 | |
| KR | 101668386 | B1 | 10/2016 | |
| KR | 20180002950 | A | 1/2018 | |
| KR | 101862654 | B1 | 5/2018 | |
| KR | 101989949 | B1 | 6/2019 | |
| KR | 20210097539 | A | 8/2021 | |
| KR | 102331633 | B1 | 11/2021 | |
| KR | 20240098544 | A * | 6/2024 | B25J 9/0009 |

* cited by examiner 200, 200-1, 200-2

GRIPPER

CROSS-REFERENCE TO RELATED APPLICATIONS

This application claims the benefit of Korean Patent Application No. 10-2022-0123598, filed on Sep. 28, 2022, which application is hereby incorporated herein by reference.

TECHNICAL FIELD

The present disclosure relates to a gripper.

BACKGROUND

A finger module that simulates a motion of a finger of a person is mounted in an adaptive gripper that simulates a motion of a hand of a person who desires to grip an object. The finger module generally has a joint structure and simulates a finger of a person who grips an object by moving the joint structure.

Meanwhile, according to a conventional technology, an individual power source, that is, a motor, is mounted on each of the finger modules to drive the finger modules. Accordingly, according to the conventional technology, when the gripper includes a plurality of finger modules, a volume of the gripper increases and it is difficult to implement a light weight and a small size of the gripper.

Furthermore, because the gripper is driven in a scheme of gripping the object by simply controlling only motions of the finger modules, a posture for gripping the object is restrictive.

SUMMARY

The present disclosure relates to a gripper. Particular embodiments relate to a gripper that may simulate a motion of a hand of a person.

Embodiments of the present disclosure can solve problems occurring in the prior art while advantages achieved by the prior art are maintained intact.

An embodiment of the present disclosure provides a gripper that may not only reduce a weight and a size of the gripper by reducing the number of motors mounted on the gripper but also may grip an object in various postures.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a gripper includes a body part, a finger base part coupled to the body part to be rotatable, and a finger part coupled to one side of the body part or the finger base part, and coupled to the body part or the finger base part to be reciprocal. The finger base part includes a first finger base part and a second finger base part, and when the first finger base part is rotated in a first direction with respect to the body part, the second finger base part is provided to be rotatable in a second direction that is an opposite direction to the first direction with respect to the body part.

The finger part may include a first finger part coupled to the body part and a second finger part coupled to the finger base part, and the second finger part is configured such that the second finger part also is moved toward an area in which the finger base part is coupled to the body part when the first finger part is moved toward the area in which the finger base part is coupled to the body part, and the second finger part also is moved toward the area in which the finger base part is coupled to the body part when the first finger part is moved to become farther from the area in which the finger base part is coupled to the body part.

The body part may include a first motor that rotates a first rotary shaft, an input bevel gear coupled to the first rotary shaft, and an output bevel gear engaged with the input bevel gear. The output bevel gear may include a first output bevel gear engaged with one area of the input bevel gear and a second output bevel gear engaged to an opposite area of the input bevel gear in a state in which the second output bevel gear faces the first output bevel gear while the input bevel gear is interposed therebetween. The first finger base part may be rotated in conjunction with rotation of the first output bevel gear, and the second finger base part may be rotated in conjunction with rotation of the second output bevel gear.

The first output bevel gear and the second output bevel gear may be sector gears, respectively.

A central angle of the sector gear provided as the first output bevel gear and a central angle of the sector gear provided as the second output bevel gear may correspond to each other.

The body part may further include a coupler link having an interior space, in which the output bevel gear is fixedly coupled. The coupling link may include a first coupler link, to which the first output bevel gear is fixedly coupled, and a second coupler link, to which the second output bevel gear is fixedly coupled, the first finger base part may be coupled to the first coupler link, and the second finger base part may be coupled to the second coupler link.

The body part may further include a second motor that rotates a second rotary shaft, a central gear that is rotated in conjunction with the second rotary shaft, and a peripheral gear engaged with the central gear. The first finger part may be coupled to be reciprocal with respect to the body part, the second finger part may be coupled to be reciprocal with respect to the finger base part, and the first finger part and the second finger part may receive power from the peripheral gear to be reciprocal.

The peripheral gear may include a first peripheral gear that receives power from the central gear and transmits the power to the first finger part and a second peripheral gear that receives power from the central gear and transmits the power to the second finger part.

The body part may further include a (1-1)-th pulley member coupled to be rotatable together with the first peripheral gear, a first belt member surrounding an outer side of the (1-1)-th pulley member and that receives power from the (1-1)-th pulley member to be movable, and a first finger mount member fixedly coupled to one side of the first belt member, and the first finger part may be fixedly coupled to the first finger mount member.

The body part may further include a (2-1)-th pulley member coupled to be rotatable together with the second peripheral gear, and the finger base part may include a second belt member surrounding an outer side of the (2-1)-th pulley member and that receives power from the (2-1)-th pulley member to be movable, and a second finger mount member fixedly coupled to one side of the second belt member, and the second finger part may be fixedly coupled to the second finger mount member.

A radius of the (1-1)-th pulley member may be smaller than that of the first peripheral gear.

A radius of the (2-1)-th pulley member may be smaller than that of the second peripheral gear.

The body part may further include a (1-2)-th pulley member spaced apart from the (1-1)-th pulley member, configured such that the first belt member surrounds an outer side thereof, and being rotatable.

The finger base part may further include a (2-2)-th pulley member spaced apart from the (2-1)-th pulley member, configured such that the second belt member surrounds an outer side thereof, and being rotatable.

The first finger mount member may include a first fixing area being an area through which the first belt member passes and to which the first belt member is fixed relatively, and a first through area being an area through which the first belt member passes and in which the first belt member is provided to be movable with respect to the first finger mount member. The first belt member may have a closed curve shape, and the first fixing area and the first through area may face each other while being spaced apart from each other by a radius of the (1-1)-th pulley member.

The second finger mount member may include a second fixing area being an area through which the second belt member passes, and to which the second belt member is fixedly coupled, and a second through area being an area through which the second belt member passes, and in which the second belt member is movable with respect to the second finger mount member. The second bent member has a closed curve shape, and the second fixing area and the second through area face each other while being spaced apart from each other by a radius of the (2-1)-th pulley member.

The body part may further include a body frame member provided on one side of the first motor, a first rail member fixedly coupled to one surface of the body frame member, and a first guide member provided to be movable along a lengthwise direction of the first rail member, and to which the first finger mount member is fixedly coupled.

The first motor may be provided between the body frame member and the first belt member and passes through the first finger mount member.

The finger base part may further include a base frame member provided on one side of the (2-2)-th pulley member, a second rail member fixedly coupled to one surface of the base frame member, and a second guide member provided to be movable along a lengthwise direction of the second rail member, and to which the second finger mount member is fixedly coupled.

The second finger mount member may include a second fixing area being an area through which the second belt member passes and to which the second belt member is fixed relatively with respect to the second finger mount member, and a second through area being an area through which the second belt member passes and in which the second belt member is provided to be movable with respect to the second finger mount member. The second belt member may have a closed curve shape, and the second fixing area and the second through area may face each other while being spaced apart from each other by a radius of the (2-1)-th pulley member.

The finger base part may further include a clamp member that fixes the second belt member to the second fixing area, and the clamp member may include an inner clamp fixedly coupled to the second finger mount member on an inside of the second fixing area and an outer clamp fixedly coupled to the second finger mount member on an outside of the second fixing area and facing the inner clamp while the second belt member is interposed therebetween.

The body part may further include a body-side gear fixed to an area of the body frame member that faces the finger base part, the finger base part may further include a base frame member of which at least a partial area faces the body-side gear and a base-side gear fixed to an area of the base frame member that faces the body part, and the body-side gear and the base-side gear may be engaged with each other.

The body-side gear and the base-side gear are sector gears, respectively.

A central rotation axis of the body-side gear and a central rotation axis of the central gear may correspond to each other.

A central rotation axis of the base-side gear and a central rotation axis of the peripheral gear may correspond to each other.

A size of a pitch circle of the body-side gear and a size of a pitch circle of the central gear may correspond to each other.

A size of a pitch circle of the base-side gear and a size of a pitch circle of the peripheral gear may correspond to each other.

The second rotary shaft of the second motor and the central rotation axis of the body-side gear correspond to each other, and the body-side gear may be provided between the second motor and the central gear.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, a gripper according to embodiments of the present disclosure will be described with reference to the drawings.

A gripper according to embodiments of the present disclosure may be a configuration for gripping an object. In more detail, the gripper according to embodiments of the present disclosure may be a configuration for simulating a motion of a hand of a person, which grips an object. In particular, because the gripper according to embodiments of the present disclosure may have a structure that may variously change a shape of the gripper while minimizing the number of motors as well as may flexibly change the shape according to a shape of an object, objects of various sizes and shapes may be gripped while the gripper is lightweight and small-sized.

Figure 1:
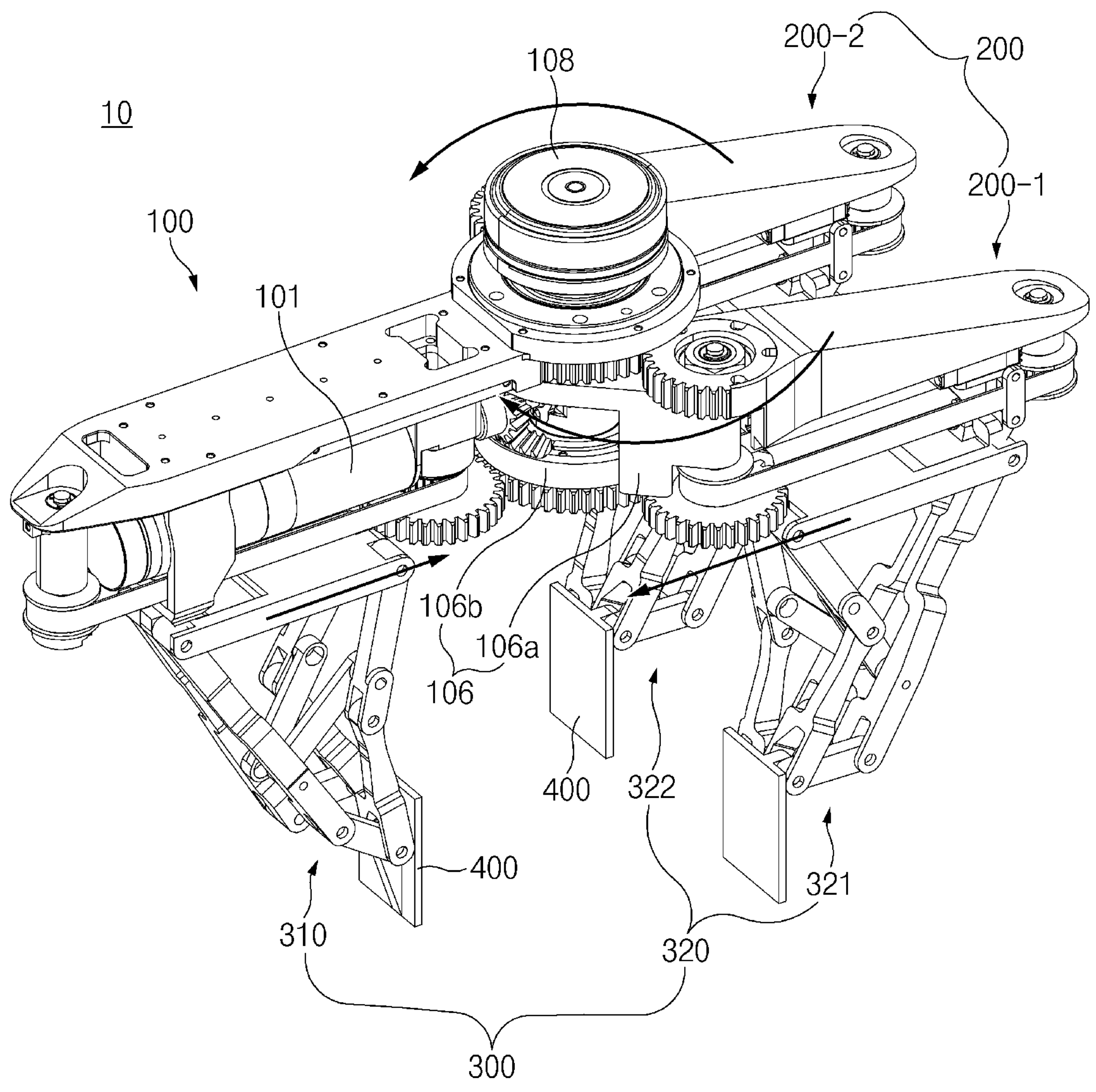
FIG. 1 is a perspective view illustrating a gripper according to embodiments of the present disclosure.
Figure 2:
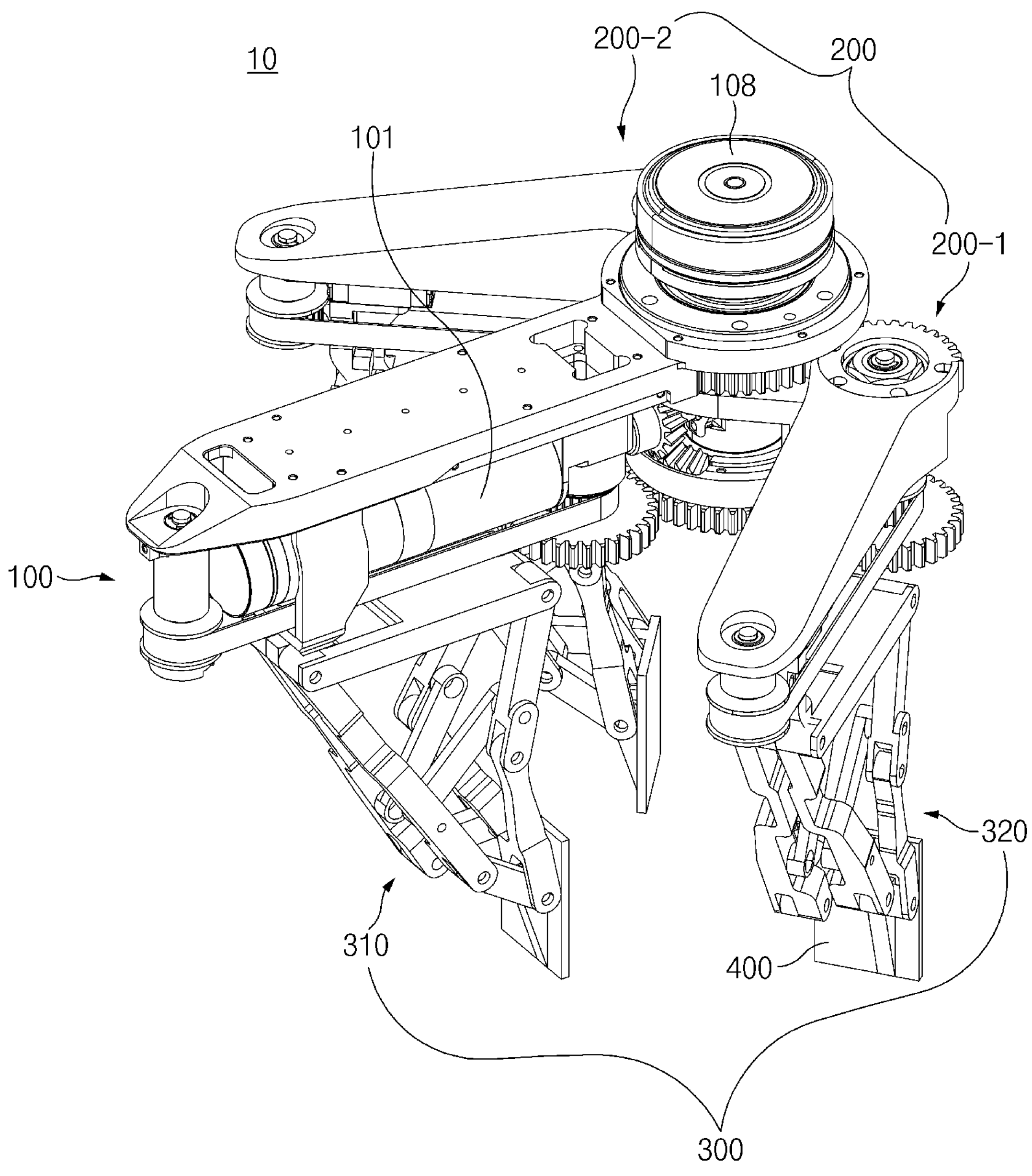
FIG. 2 is a perspective view illustrating a state in which a finger base part is rotated toward a body part in the gripper of FIG. 1.
Figure 3:
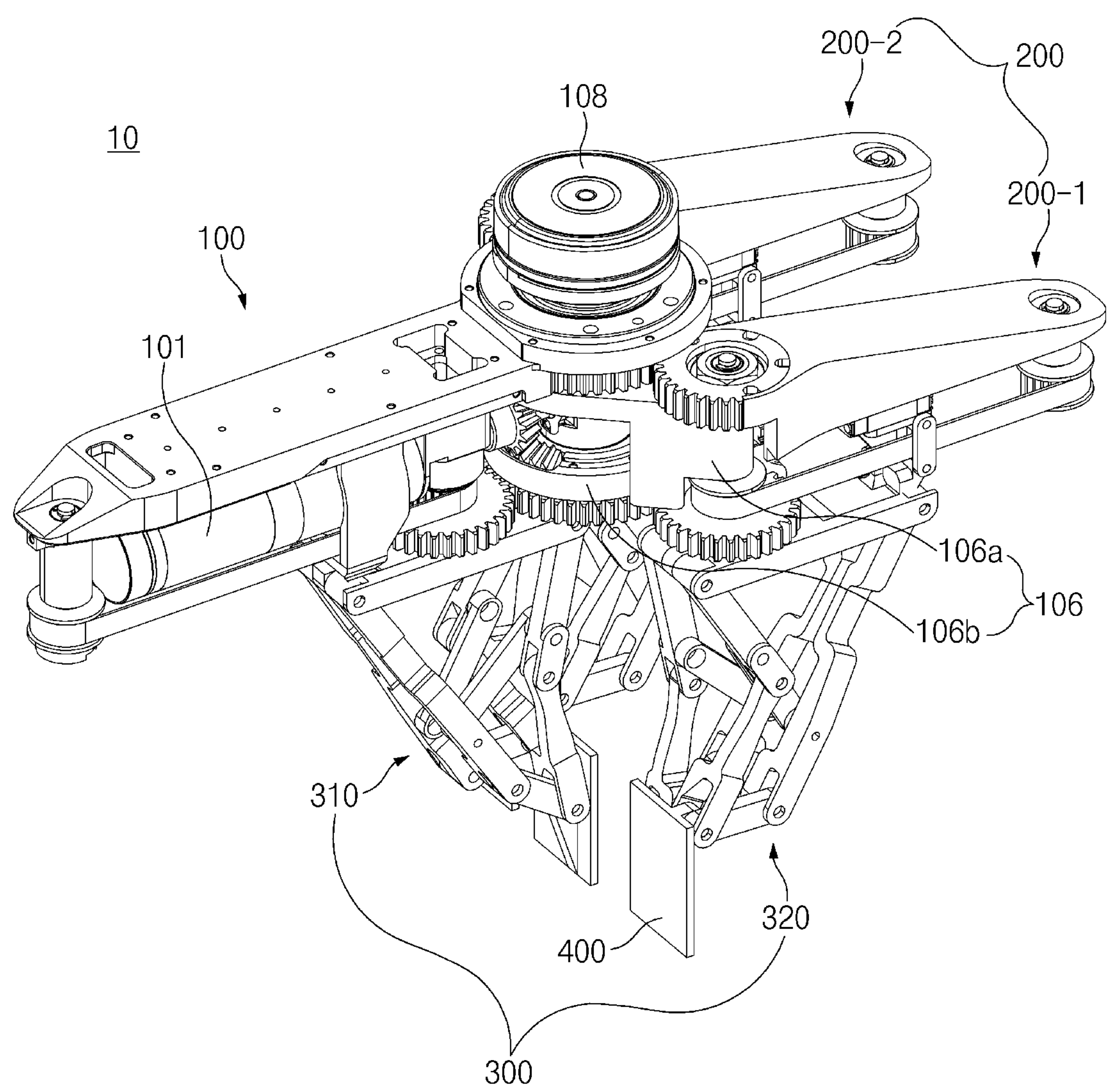
FIG. 3 is a perspective view illustrating a state in which a finger part is translated in the gripper of FIG. 1.

FIG. 1 is a perspective view illustrating a gripper according to embodiments of the present disclosure. FIG. 2 is a perspective view illustrating a state in which a finger base part is rotated toward a body part in the gripper of FIG. 1. FIG. 3 is a perspective view illustrating a state in which a finger part is translated in the gripper of FIG. 1.

Referring to FIGS. 1 to 3, a gripper 10 may include a body part 100. The body part 100 is a main configuration of the gripper 10, the finger base part and the finger part may be provided with the body part 100 being a center thereof, and the finger base part and the finger part may be moved with respect to the body part 100. When it is understood that the gripper 10 is a device for simulating a motion of a hand of a person, the body part 100 may be regarded as a configuration corresponding to a partial area of a palm of the person.

The gripper 10 may further include a finger base part 200 that is coupled to the body part 100 to be rotatable and a finger part 300 that is coupled to one side of the body part 100 or the finger base part 200 and is coupled to the body part 100 and the finger base part 200 to be reciprocal. The finger part 300 may be coupled only to the body part 100 or may be coupled only to the finger base part 200. In a more preferred embodiment, the finger part 300 may be coupled to the body part 100 and the finger base part 200. That is, as illustrated in FIGS. 1 to 3, the finger part 300 may include a first finger part 310 coupled to the body part 100 and a second finger part 320 coupled to the finger base part 200.

Meanwhile, the finger base part 200 may include a first finger base part 200-1 and a second finger base part 200-2. The first finger base part 200-1 and the second finger base part 200-2 may be coupled to the body part 100 to be rotatable. Meanwhile, the second finger part 320 may include a (2-1)-th finger part 321 coupled to the first finger base part 200-1 and a (2-2)-th finger part 322 coupled to the second finger base part 200-2.

In a more preferred embodiment, the first finger base part 200-1 and the second finger base part 200-2 may have structures that correspond to each other or are substantially the same. Accordingly, all contents, which will be described below as a configuration and characteristics of the finger base part 200 may be applied to the first finger base part 200-1 and the second finger base part 200-2 in the same way.

Then, according to embodiments of the present disclosure, the first finger base part 200-1 and the second finger base part 200-2 may be coupled to the body part 100 to be rotatable in opposite directions. In more detail, when the first finger base part 200-1 is rotated in a first direction with respect to the body part 100, the second finger base part 200-2 may be rotated in a second direction that is opposite to the first direction with respect to the body part 100.

Furthermore, according to embodiments of the present disclosure, the first finger part 310 and the second finger part 320 may be configured such that the second finger part 320 is moved toward an area in which the finger base part 200 is coupled to the body part wo when the first finger part 310 is moved toward the area in which the finger base part 200 is coupled to the body part 100, and the second finger part 320 is moved to become farther from the area in which the finger base part 200 is coupled to the body part wo when the first finger part 310 is moved to become farther from the area in which the finger base part 200 is coupled to the body part 100. This may be understood that the first finger part 310 and the second finger part 320 are mechanically constricted by each other such that the first finger part 310 and the second finger part 320 become closer to each other whereby the gripper 10 grips the object and the first finger part 310 and the second finger part 320 are mechanically constricted by each other such that the first finger part 310 and the second finger part 320 become farther from each other whereby the gripper 10 releases the object.

FIG. 2 illustrates a state in which the first finger base part 200-1 and the second finger base part 200-2 are located to be adjacent to the body part 100 as the first finger base part 200-1 and the second finger base part 200-2 are rotated in opposite directions with respect to the body part 100 in the gripper 10 in the state of FIG. 1. Furthermore, FIG. 3 illustrates a state in which the first finger part 310 and the second finger part 320 are located to be closer to each other as the first finger part 310 coupled to the body part 100 is linearly moved toward the area in which the finger base part 200 is coupled to the body part 100 and the second finger part 320 provided in the first finger base part 200-1 and the second finger base part 200-2 is linearly moved toward the area in which the finger base part 200 is coupled to the body part wo.

Hereinafter, detailed configurations of the body part 100 and the finger base part 200 for rotating the first finger base part 200-1 and the second finger base part 200-2 in opposite directions will be described in detail.

Figure 4:
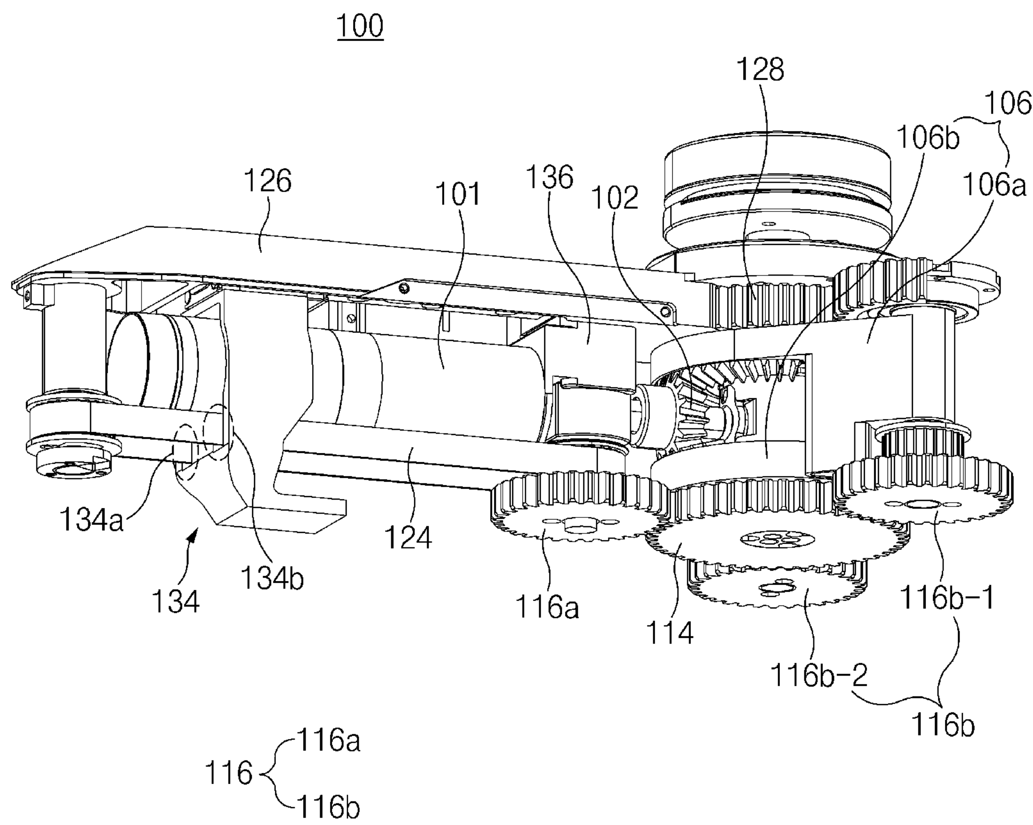
FIG. 4 is a perspective view illustrating a body part of a gripper according to embodiments of the present disclosure.
Figure 5:
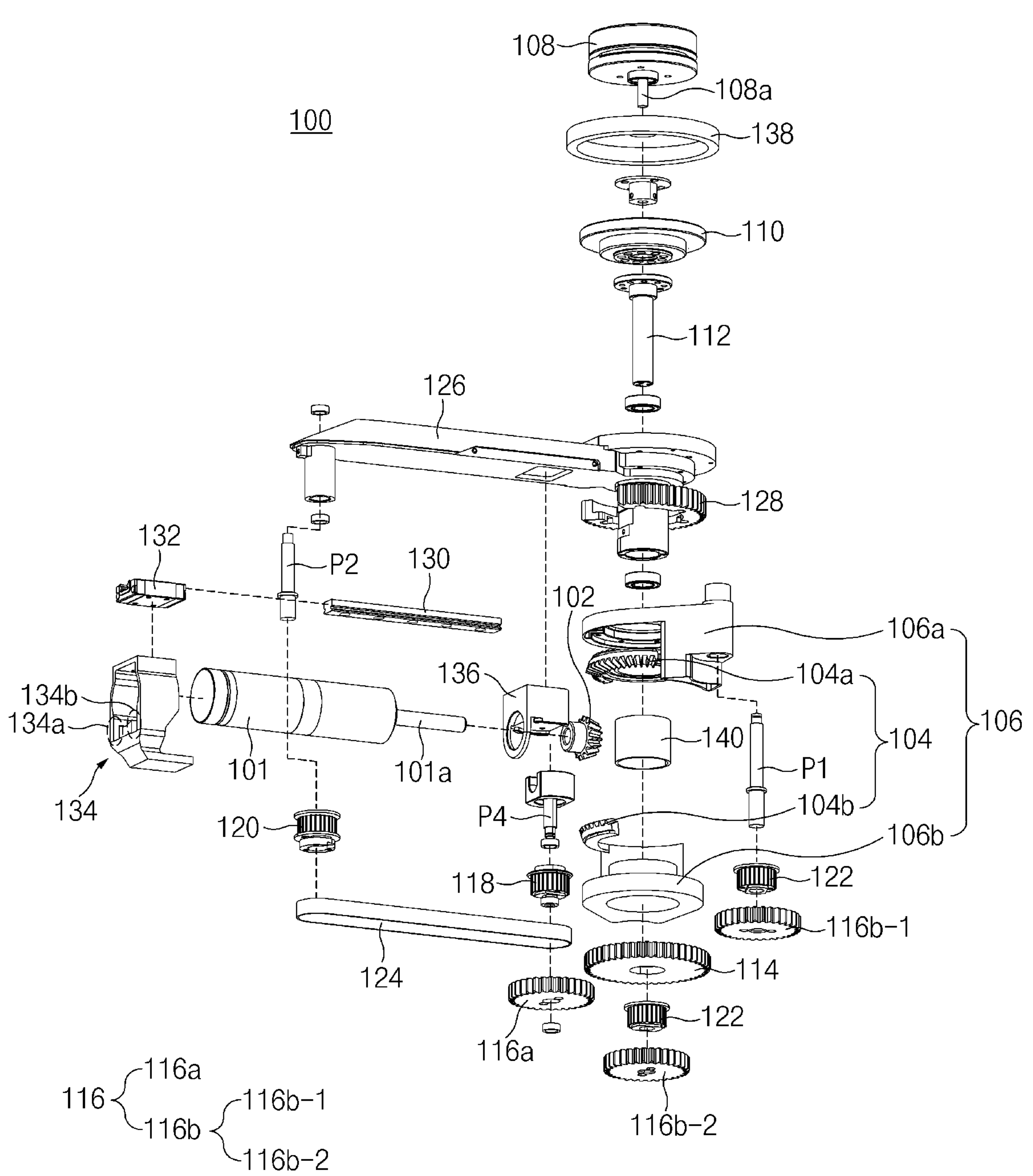
FIG. 5 is an exploded perspective view illustrating a body part of a gripper according to embodiments of the present disclosure.

FIG. 4 is a perspective view illustrating the body part of the gripper according to embodiments of the present disclosure. FIG. 5 is an exploded perspective view illustrating the body part of the gripper according to embodiments of the present disclosure.

Referring to FIGS. 4 and 5, the body part 100 may include a first motor 101 that rotates a first rotary shaft 101*a*. The first motor 101 may provide power that is necessary for rotation of the finger base part 200 with respect to the body part wo. In particular, according to embodiments of the present disclosure, both rotation of the first finger base part 200-1 and rotation of the second finger base part 200-2 may be implemented only by the first motor 101.

The body part 100 may further include an input bevel gear 102 that is coupled to the first rotary shaft Iola and an output bevel gear 104 that is engaged with the input bevel gear 102. Accordingly, when the first rotary shaft Iola is rotated, the input bevel gear 102 is rotated, and thus, the output bevel gear 104 engaged with the input bevel gear 102 also is rotated.

In more detail, the output bevel gear 104 may include a first output bevel gear 104*a* that is engaged with one area of the input bevel gear 102 and a second output bevel gear 104*b* that is engaged with an opposite area of the input bevel gear 102 in a state in which it faces the first output bevel gear 104*a* while the input bevel gear 102 is interposed therebetween. Accordingly, rotational directions of the first output bevel gear 104*a* and the second output bevel gear 104*b* may be opposite to each other. FIGS. 4 and 5 illustrate a state in which the second output bevel gear 104*b* is engaged with a lower area of the input bevel gear 102 when the first output bevel gear 104*a* is engaged with an upper area of the input bevel gear 102.

Then, the first finger base part 200-1 may be rotated in conjunction with rotation of the first output bevel gear 104*a*, and the second finger base part 200-2 may be rotated in conjunction with rotation of the second output bevel gear 104*b*. In more detail, a rotational direction of the first output bevel gear 104*a* and a rotational direction of the first finger base part 200-1 may be the same, and a rotational direction of the second output bevel gear 104*b* and a rotational direction of the second finger base part 200-2 may be the same. Accordingly, according to embodiments of the present disclosure, both the first finger base part 200-1 and the second finger base part 200-2 may be rotated only by the first motor 101, and the rotational direction of the first finger base part 200-1 and the rotational direction of the second finger base part 200-2 may be opposite to each other.

Meanwhile, a rotation range of the first finger base part 200-1 and a rotation range of the second finger base part 200-2 with respect to the body part 100 may be restricted to a range of a specific rotation angle. Accordingly, the first output bevel gear 104*a* and the second output bevel gear 104*b* may be sector gears. A sector gear means a gear that is formed not at an entire circumference of a gear but only in a partial area of the circumference. A central angle of the area of the sector gear in which the gear is formed, may correspond to the rotation range of the first finger base part 200-1 and the rotation range of the second finger base part 200-2. More preferably, a central angle of the sector gear provided as the first output bevel gear 104*a* and a central angle of the sector gear provided as the second output bevel gear 104*b* may correspond to each other.

Meanwhile, the body part wo may further include a coupler link 106 having an interior space, in which the output bevel gear 104 is fixedly coupled, and to which the output bevel gear 104 is fixedly coupled through the interior space. In more detail, the coupler link 106 may include a first coupler link 106*a*, to which the first output bevel gear 104*a* is fixedly coupled, and a second coupler link 106*b*, to which the second output bevel gear 104*b* is fixedly coupled.

The coupler link 106 may be a configuration for connecting the output bevel gear 104 and the finger base part 200. Accordingly, the first finger base part 200-1 may be coupled to the first coupler link 106*a*, and the second finger base part 200-2 may be coupled to the second coupler link 106*b*. In more detail, as illustrated in FIGS. 4 and 5, the body part wo may further include a pin member P1 that passes through the first coupler link 106*a* and the first finger base part 200-1 and a pin member P2 that passes through the second coupler link 106*b* and the second finger base part 200-2, and through the pin members, the first coupler link 106*a* and the first finger base part 200-1 may be coupled to each other and the second coupler link 106*b* and the second finger base part 200-2 may be coupled to each other.

In more detail, the first coupler link 106*a* and the first output bevel gear 104*a* may be fixedly coupled to each other, and the second coupler link 106*b* and the second output bevel gear 104*b* may be fixedly coupled to each other. As an example, FIGS. 4 and 5 illustrate a state in which the first coupler link 106*a* is provided on an upper side of the second coupler link 106*b*, and the first coupler link 106*a* and the second coupler link 106*b* overlap each other when viewed from a top.

Hereinafter, detailed configurations of the body part 100 and the finger base part 200 for linearly reciprocating the first finger part 310 and the second finger part 320 will be described in detail.

As illustrated in FIGS. 4 and 5, the body part wo may further include a second motor 108 that rotates a second rotary shaft 108*a*, a central gear 114 that is rotated in conjunction with the second rotary shaft 108*a*, and a peripheral gear 116 that is provided on an outer side of the central gear 114 and is engaged with the central gear 114. In more detail, the body part 100 may further include a main shaft 112 that is rotated in conjunction with the second rotary shaft 108*a*, and the central gear 114 may be fixed relatively with respect to the main shaft 112 and is rotated together with the main shaft 112. As an example, the body part 100 may further include a reduction member no that is provided between the second rotary shaft 108*a* and the main shaft 112 and reduces a rotational speed of the second rotary shaft 108*a* and then transmits the rotation to the main shaft 112. The reduction member no, for example, may be a harmonic reducer. Furthermore, rotation axes of the second rotary shaft 108*a*, the main shaft 112, and the central gear 114 may be provided on the same axis.

Then, according to embodiments of the present disclosure, the first finger part 310 coupled to the body part 100 may be coupled to the body part 100 to be reciprocal, and the second finger part 320 coupled to the finger base part 200 may be coupled to the finger base part 200 to be reciprocal. In particular, the first finger part 310 and the second finger part 320 may be configured to receive power from the peripheral gear 116 to be reciprocal. That is, the rotation of the peripheral gear 116 may be transmitted to the finger part 300 after being converted to translation by a belt member and the like, which will be described below.

Meanwhile, the peripheral gear 116 may include a first peripheral gear 116*a* that is engaged with the central gear 114 and receives power from the central gear 114 and transmits the power to the first finger part 310, and a second peripheral gear 116*b* that is engaged with the central gear 114 and receives power from the central gear 114 and transmits the power to the second finger part 320.

In particular, the second peripheral gear 116*b* may include a (2-1)-th peripheral gear 116*b-i* that transmits power to the (2-1)-th finger part 321 and a (2-2)-th peripheral gear 116*b*-2 that transmits power to the (2-2)-th finger part 322.

Subsequently, referring to FIGS. 4 and 5, the body part wo may further include a plurality of pulley members and a belt member.

In more detail, the body part wo may further include a (1-1)-th pulley member 118 that is coupled to be rotatable together with the first peripheral gear 116*a* and a first belt member 124 that surrounds an outer surface of the (1-1)-th pulley member 118 and receives the power from the (1-1)-th pulley member 118 to be movable. That is, according to embodiments of the present disclosure, the rotation of the first peripheral gear 116*a* may be converted to a linear movement after being transmitted to the first belt member 124 via the (1-1)-th pulley member 118.

Then, the body part wo may further include a first finger mount member 134 that is fixedly coupled to one side of the first belt member 124, and the first finger part 310 may be fixedly coupled to the first finger mount member 134. Accordingly, the first finger mount member 134 may be linearly moved as the first belt member 124 is linearly moved, and the first finger part 310 fixedly coupled to the first finger mount member 134 also may be linearly moved. Meanwhile, as illustrated in FIGS. 4 and 5, the body part wo may further include a (1-2)-th pulley member 120 that is spaced apart from the (1-1)-th pulley member 118, is configured such that the first belt member 124 surrounds an outer surface thereof, and is configured to be rotatable.

Subsequently, referring to FIGS. 4 and 5, the body part 100 may further include a body frame member 126 provided on one side of the first motor 101, a first rail member 130 fixedly coupled to one side of the body frame member 126, and a first guide member 132 that is configured to be movable along a lengthwise direction of the first rail member 130 and to which the first finger mount member 134 is fixedly coupled. As an example, FIGS. 4 and 5 illustrate a state in which the first rail member 130 is fixedly coupled to a lower surface of the body frame member 126 and the first guide member 132 is coupled to a lower side of the first rail member 130. The first rail member 130 and the first guide member 132 may be configurations for constricting the first finger mount member 134 from being moved in a direction, other than a direction in which it is moved by the first belt member 124, in a process of the first finger mount member 134 receiving power from the first belt member 124 and reciprocating.

Meanwhile, as an example, the first motor 101 may be provided between the body frame member 126 and the first belt member 124 and may be configured to pass through the first finger mount member 134. In this case, because a volume occupied by the first motor 101 may be minimized, an overall size of the gripper 10 may be reduced. FIGS. 4 and 5 illustrate a state in which the first motor 101 is provided in a lower area of the body frame member 126 and an upper area of the first belt member 124. Meanwhile, as illustrated in FIGS. 4 and 5, the body part 100 may further include the pin member P2 that is inserted into and coupled to the body frame member 126 and the (1-2)-th pulley member 120, and the (1-2)-th pulley member 120 may be coupled to the body frame member 126 to be rotatable through the pin member P2.

Figure 6:
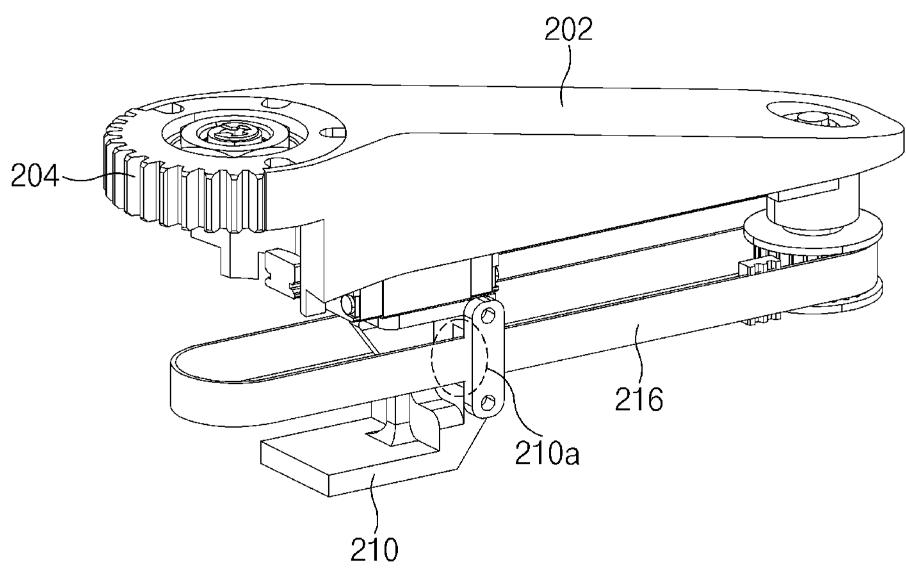
FIG. 6 is a perspective view illustrating a finger body part of a gripper according to embodiments of the present disclosure.
Figure 7:
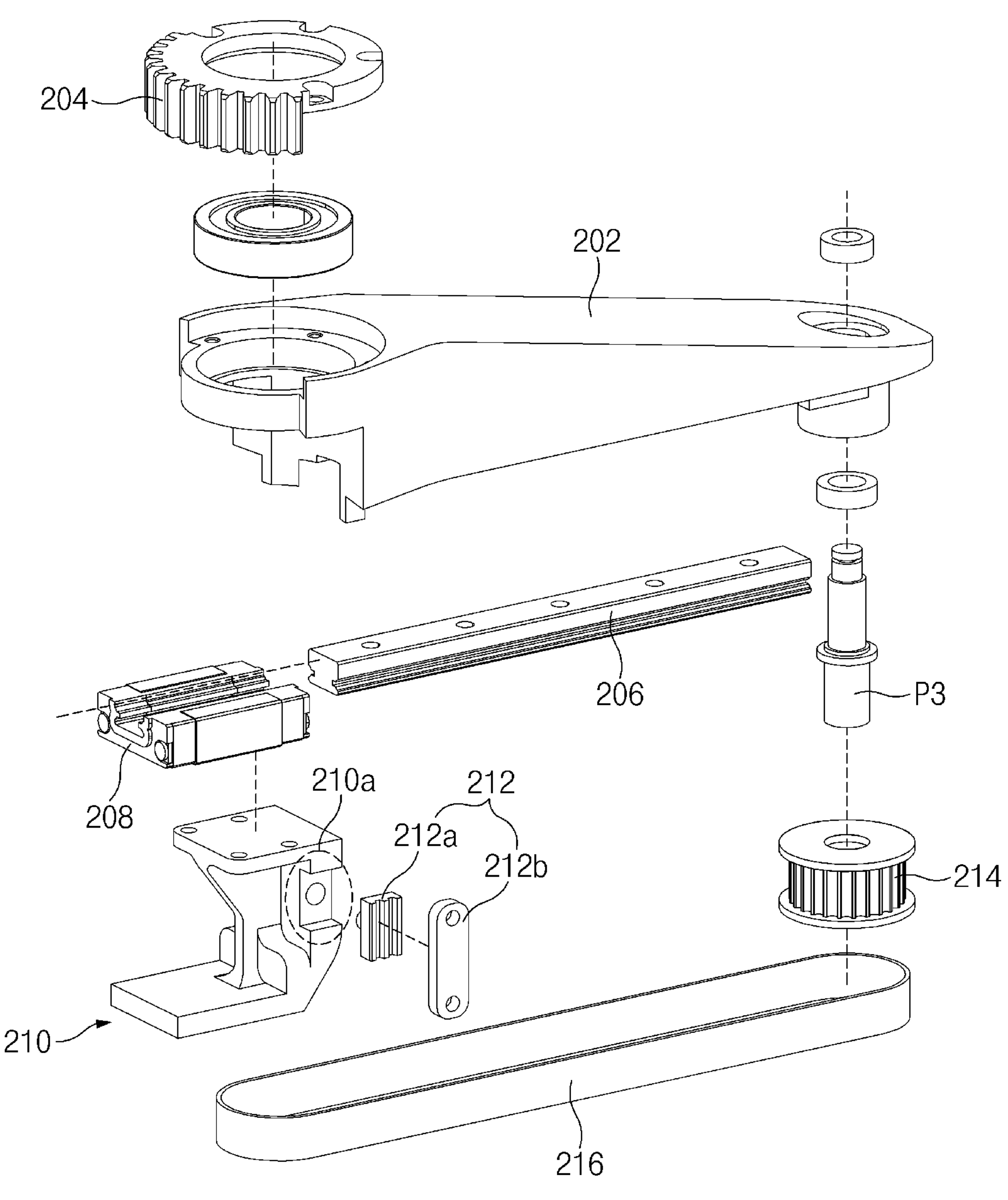
FIG. 7 is an exploded perspective view illustrating a finger body part of a gripper according to embodiments of the present disclosure.

FIG. 6 is a perspective view illustrating the finger body part of the gripper according to embodiments of the present disclosure. FIG. 7 is an exploded perspective view illustrating the finger body part of the gripper according to embodiments of the present disclosure.

The body part 100 may further include a (2-1)-th pulley member 122 that is provided to be rotatable together with the second peripheral gear 116*b*. The (2-1)-th pulley member 122 may be provided in the (2-1)-th peripheral gear 116*b*1-1 and the (2-2)-th peripheral gear 116*b*-2, respectively. In more detail, the second peripheral gear 116*b* and the (2-1)-th pulley member 122 may be coupled to the coupler link 106 to be rotatable through the pin member.

Meanwhile, as illustrated in FIGS. 6 and 7, the finger base part 200 may include a second belt member 216 that surrounds an outer side of the (2-1)-th pulley member 122 and receives power from the (2-1)-th pulley member 122 to be rotatable. That is, according to embodiments of the present disclosure, the rotation of the second peripheral gear 116*b* may be converted to a linear movement after being transmitted to the second belt member 216 via the (2-1)-th pulley member 122. More preferably, the second belt member 216 may be provided in the first finger base part 200-1 and the second finger base part 200-2, respectively.

Then, the finger base part 200 may include a second finger mount member 210 that is fixedly coupled to one side of the second belt member 216, and the second finger part 320 may be fixedly coupled to the second finger mount member 210. The second finger mount member 210 may be linearly moved as the second belt member 216 is linearly moved, and the second finger part 320 fixedly coupled to the second finger mount member 210 also may be linearly moved. Meanwhile, as illustrated in FIGS. 4 and 5, the finger base part 200 may further include a (2-2)-th pulley member 214 that is spaced apart from the (2-1)-th pulley member 122, is configured such that the second belt member 216 surrounds an outer surface thereof, and is configured to be rotatable.

Meanwhile, FIGS. 4 and 5 illustrate a state in which a radius of the (1-1)-th pulley member 118 is smaller than a radius of the first peripheral gear 116*a*, and illustrate a state in which a radius of the (2-1)-th pulley member 122 is smaller than a radius of the second peripheral gear 116*b*.

Subsequently, as illustrated in FIGS. 6 and 7, the finger base part 200 may further include the (2-2)-th pulley member 214 that is spaced apart from the (2-1)-th pulley member 122, is configured such that the second belt member 216 surrounds an outer surface thereof, and is coupled to be rotatable. In more detail, the finger base part 200 may further include a pin member P3 that is inserted into and coupled to a base frame member 202 and the (2-2)-th pulley member 214, which will be described below, and the (2-2)-th pulley member 214 may be coupled to the base frame member 202 to be rotatable through the pin member P3.

Meanwhile, as described above, the first finger mount member 134 may be fixedly coupled to one side of the first belt member 124. In more detail, one side of the first finger mount member 134 may be fixedly coupled to the first belt member 124 and an opposite side of the first finger mount member 134 may be movable with respect to the first belt member 124.

In more detail, as illustrated in FIG. 5, the first finger mount member 134 may include a first fixing area 134*a* that is an area through which the first belt member 124 passes and to which the first belt member 124 is relatively fixed, and a first through area 134*b* that is an area through which the first belt member 124 passes and in which the first belt member 124 is configured to be movable with respect to the first finger mount member 134. Then, the first belt member 124 may have a closed curve shape, and the first fixing area 134*a* and the first through area 134*b* may face each other while being spaced apart from each other by radii of the (1-1)-th pulley member 118 and the (1-2)-th pulley member 120. This may be understood that, because the first belt member 124 is primarily bent in an area that surrounds the (1-1)-th pulley member 118 and is secondarily bent in an area that surrounds the (1-2)-th pulley member 120, the first belt member 124 may include one section that connects the (1-1)-th pulley member 118 and the (1-2)-th pulley member 120, and an opposite section that is spaced apart from the one section and connects the (1-1)-th pulley member 118 and the (1-2)-th pulley member 120, and the first fixing area 134*a* is provided in the above-described one section and the first through area 134*b* is provided in the above-described opposite section.

Meanwhile, the finger base part 200 may further include the base frame member 202 that is provided on one side of the (2-2)-th pulley member 214, a second rail member 206 that is fixedly coupled to one surface of the base frame member 202, and a second guide member 208 that is configured to be movable along a lengthwise of the second rail member 206 and to which the second finger mount member 210 is fixedly coupled. As an example, FIGS. 6 and 7 illustrate a state in which the second rail member 206 is fixedly coupled to a lower surface of the base frame member 202 and the second guide member 208 is coupled to a lower side of the second rail member 206. The second rail member 206 and the second guide member 208 may be configurations for constricting the second finger mount member 210 from being moved in a direction, other than a direction in which it is moved by the second belt member 216, in a process of the second finger mount member 210 receiving power from the second belt member 216 and reciprocating.

Meanwhile, as described above, the second finger mount member 210 may be fixedly coupled to one side of the second belt member 216. In more detail, one side of the second finger mount member 210 may be fixedly coupled to the second belt member 216 and an opposite side of the second finger mount member 210 may be movable with respect to the second belt member 216.

In more detail, as illustrated in FIG. 7, the second finger mount member 210 may include a second fixing area 210*a*, which is an area through which the second belt member 216 passes and to which the second belt member 216 is fixed relatively with respect to the second finger mount member 210, and a first through area, which is an area through which the second belt member 216 passes and in which the second belt member 216 is movable with respect to the second finger mount member 210. Then, the second belt member 216 may have a closed curve shape, and the second fixing area 210*a* and the second through area may face each other while being spaced apart from each other by radii of the (2-1)-th pulley member 122 and the (2-2)-th pulley member 214. This may be understood that, because the second belt member 216 is primarily bent in an area that surrounds the (2-1)-th pulley member 122 and is secondarily bent in an area that surrounds the (2-2)-th pulley member 214, the second belt member 216 may include one section that connects the (2-1)-th pulley member 122 and the (2-2)-th pulley member 214 and an opposite section that is spaced apart from the one section and connects the (2-1)-th pulley member 122 and the (2-2)-th pulley member 214, and the second fixing area 210*a* is provided in the above-described one section and the second through area is provided in the above-described opposite section.

In more detail, the finger base part 200 may further include a clamp member 212 that fixes the second belt member 216 to the second fixing area 210*a*. As illustrated in FIG. 7, the clamp member 212 may include an inner clamp 212*a* that is fixedly coupled to the second finger mount member 210 on an inside of the second fixing area 210*a*, and an outer clamp 212*b* that is fixedly coupled to the second finger mount member 210 on an outside of the second fixing area 210*a* and faces the inner clamp 212*a* while the second belt member 216 being interposed therebetween. In particular, the inner clamp 212*a* and the outer clamp 212*b* may fix the second belt member 216 to the second finger mount member 210 in the second fixing area 210*a* by pressing the second belt member 216.

Subsequently, referring to FIGS. 4 to 7, the body part 100 may further include a body-side gear 128 that is fixed to an area of the body frame member 126 that faces the finger base part 200, and the finger base part 200 may further include the base frame member 202, of which at least a partial area faces the body-side gear 128, and a base-side gear 204 that is fixed to an area of the base frame member 202 that faces the body part 100. Then, the body-side gear 128 and the base-side gear 204 may be engaged with each other. Meanwhile, the base-side gear 204 may include a first base-side gear that is fixed to the base frame member 202 of the first finger base part 200-1 and a second base-side gear that is fixed to the base frame member 202 of the second finger base part 200-2. As an example, when the gripper 10 is provided as in FIGS. 1 to 7, the body-side gear 128 and the central gear 114 may face each other while the coupler link 106 is interposed therebetween, and the base-side gear 204 and the peripheral gear 116 may face each other while the coupler link 106 is interposed therebetween.

More preferably, the central rotation axes of the central gear 114 and the body-side gear 128 may correspond to each other or may be provided on the same axis, and the central rotation axes of the peripheral gear 116 and the base-side gear 204 may correspond to each other or may be provided on the same axis. Furthermore, a size of a pitch circle of the body-side gear 128 and a size of a pitch circle of the central gear 114 may correspond to each other or may be substantially the same, and a size of a pitch circle of the base-side gear 204 and a size of a pitch circle of the peripheral gear 116 may correspond to each other or may be substantially the same.

The above characteristics described in the specification may be for preventing the second finger mount member 210 from reciprocating with respect to the finger base part 200 regardless of rotation of the finger base part 200 in a state in which the second rotary shaft 108*a* of the second motor 108 is stopped. That is, when the first motor 101 is driven and the first rotary shaft Dom is rotated in a state, in which the above characteristics of embodiments of the present disclosure described in the specification are provided, the finger base part 200 is rotated about an area in which the finger base part 200 is coupled to the body part 100. Accordingly, the second peripheral gear 116*b* revolves along a circumference of the central gear 114, and the base-side gear 204 also revolves along a circumference of the body-side gear 128. Then, because a relative speed of the second peripheral gear 116*b* and the base-side gear 204 is zero, the second finger mount member 210 is relatively fixed in the finger base part 200 as long as the central gear 114 is not rotated (that is, as long as the second motor 108 is not driven). Accordingly, according to embodiments of the present disclosure, the second finger part 320 is prevented from being unnecessarily moved in a state in which the second motor 108 is not driven and rotation of the finger base part 200 due to driving of the first motor 101 and movement of the finger part 300 due to driving of the second motor 108 may be decoupled. Meanwhile, the drawings illustrate a state in which the second rotary shaft 108*a* of the second motor 108 corresponds to the central rotation axis of the body-side gear 128 or is provided on the same axis as the body-side gear 128 is provided between the second motor 108 and the central gear 114.

Meanwhile, according to embodiments of the present disclosure, similarly to the first output bevel gear 104*a* and the second output bevel gear 104*b*, the body-side gear 128 and the base-side gear 204 also may be sector gears. Then, central angles of the areas of the sector gears provided as the body-side gear 128 and the base-side gear 204 may correspond to the rotation range of the first finger base part 200-1 and the rotation range of the second finger base part 200-2, respectively. More preferably, a central angle of the sector gear provided as the body-side gear 128 and a central angle of the sector gear provided as the base-side gear 204 may correspond to each other.

Furthermore, as illustrated in FIG. 5, the body part 100 may further include a first motor mount member 136 that is fixedly coupled to one side of the body frame member 126 and to which one side of the first motor 101 is fixedly coupled. FIG. 5 illustrates a state in which the first motor mount member 136 is fixedly coupled to a lower surface of the body frame member 126 and the first rotary shaft 101*a* of the first motor 101 is connected to the input bevel gear 102 while passing through the first motor mount member 136. Furthermore, FIG. 5 illustrates a state in which a pin member P4 is fixedly coupled to the first motor mount member 136 and the pin member P4 is inserted into and coupled to the first peripheral gear 116*a* and the (1-1)-th pulley member 118.

Furthermore, as illustrated in FIG. 5, the body part 100 may further include a second motor mount member 138, which is fixedly coupled to one side of the body frame member 126 and to which one side of the second motor 108 is fixedly coupled. FIG. 5 illustrates a state in which the second motor mount member 138 is fixedly coupled to an upper surface of the body frame member 126 and illustrates a state in which the second motor 108 and the reduction member 110 face each other while the second motor mount member 138 is interposed therebetween.

Furthermore, as illustrated in FIG. 5, the body part wo may further include a spacer 140 that is provided between the central gear 114 and the body-side gear 128 and spaces the central gear 114 and the body-side gear 128 in a direction in which the central rotation axis of the central gear 114 or the central rotation axis of the body-side gear 128 extends. As an example, as illustrated in FIG. 5, a central axis of the spacer 140 may correspond to the central rotation axis of the body-side gear 128 and the central rotation axis of the central gear 114 or may be provided to be the same as that, and may have a cylindrical shape.

Meanwhile, as described above, the first finger base part 200-1 and the second finger base part 200-2 may be rotated in a direction that faces the body part wo and in a direction that becomes farther from the body part 100. In this case, when the first finger base part 200-1 and the second finger base part 200-2 are rotated to become sufficiently close to the body part 100, an object in a space between the first finger base part 200-1 and the body part wo may be gripped by a side surface of the first finger base part 200-1 and a side surface of the body part 100, and an object in a space between the second finger base part 200-2 and the body part 100 may be gripped by a side surface of the second finger base part 200-2 and the body part 100.

In addition, when the first finger base part 200-1 and the second finger base part 200-2 are rotated such that the first finger base part 200-1 and the second finger base part 200-2 become sufficiently close to each other, an object in a space between the first finger base part 200-1 and the second finger base part 200-2 also may be gripped by a side surface of the first finger base part 200-1 and a side surface of the second finger base part 200-2.

Separate pad members (not illustrated) may be additionally provided on one surface or opposite surfaces of the first finger base part 200-1 and one surface or opposite surfaces of the second finger base part 200-2 to grip the above-described object.

Hereinafter, the finger part provided in the gripper of embodiments of the present disclosure will be described below.

Figure 8:
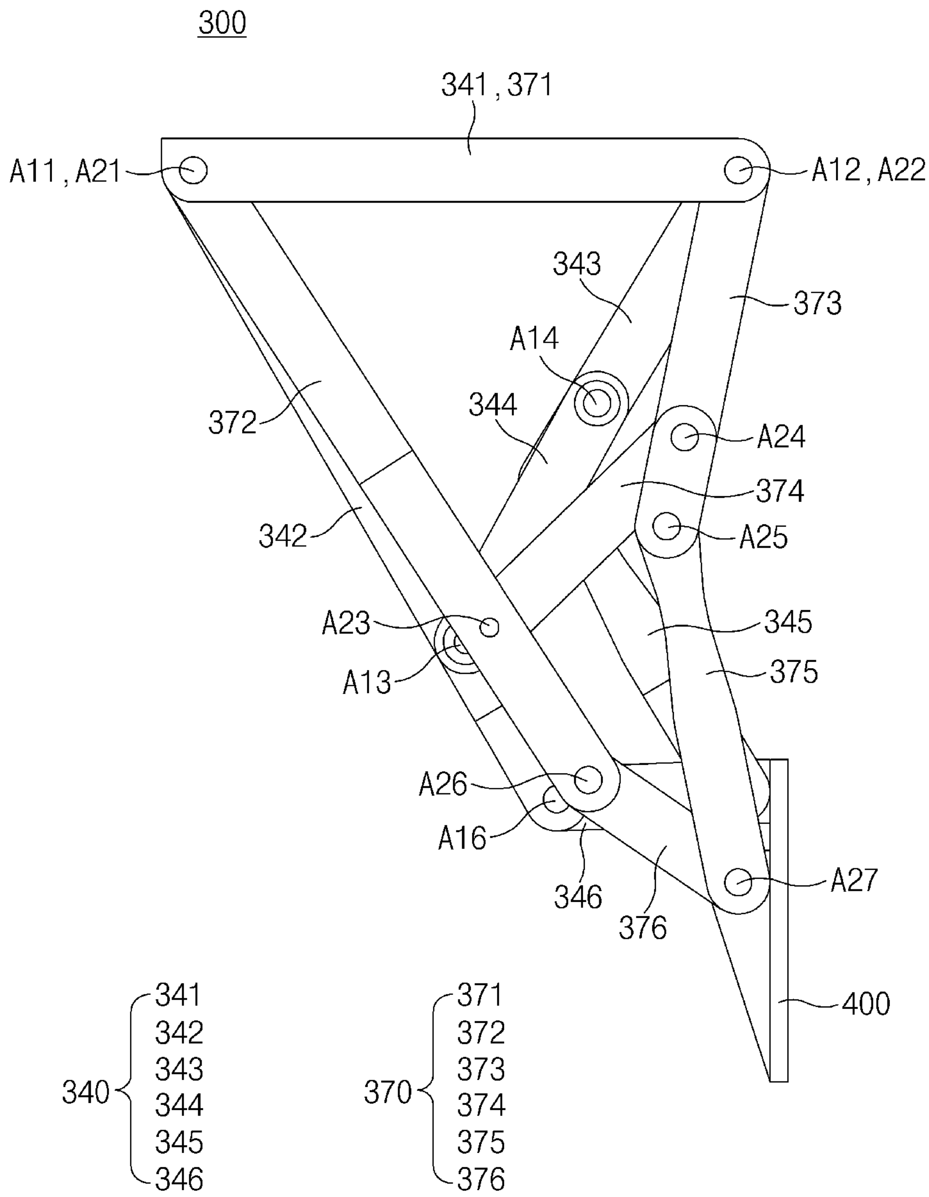
FIG. 8 is a side view illustrating a finger body part of a gripper according to embodiments of the present disclosure.
Figure 9:
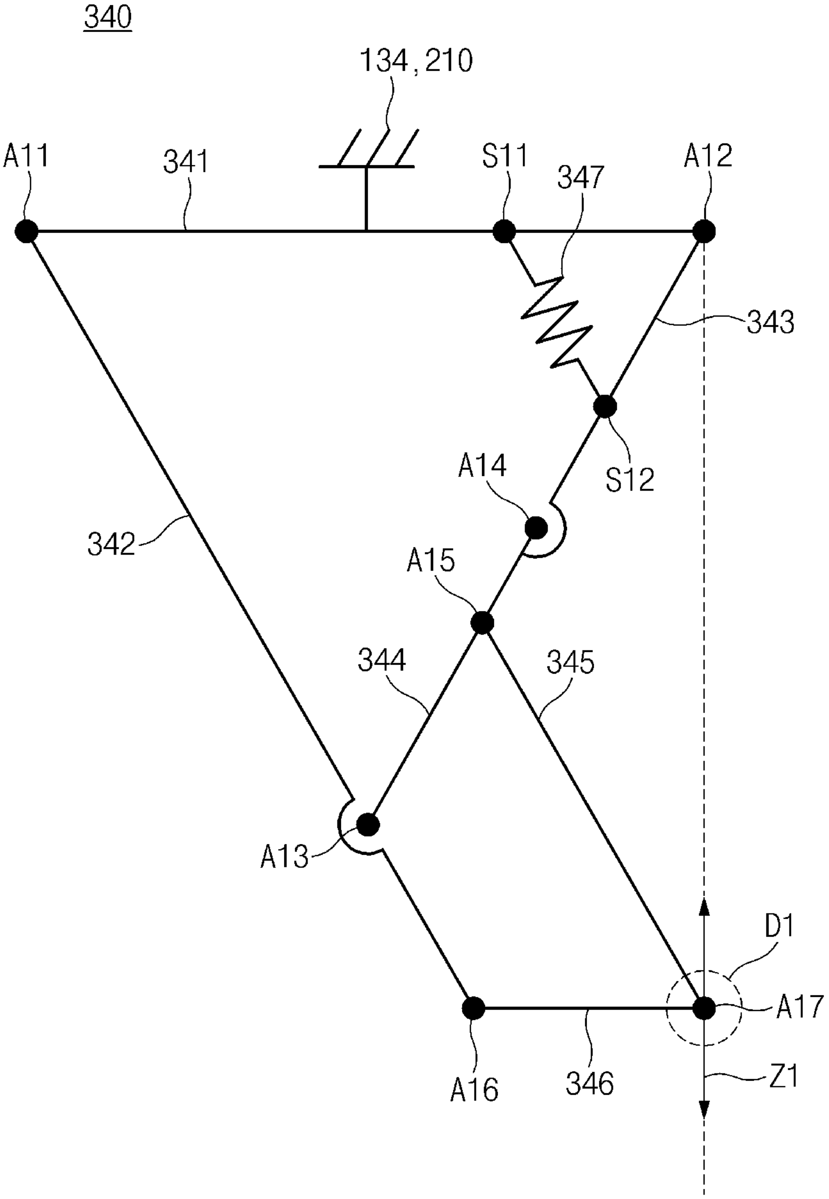
FIG. 9 is a view schematically illustrating a first link structure of the finger part of FIG. 8.
Figure 10:
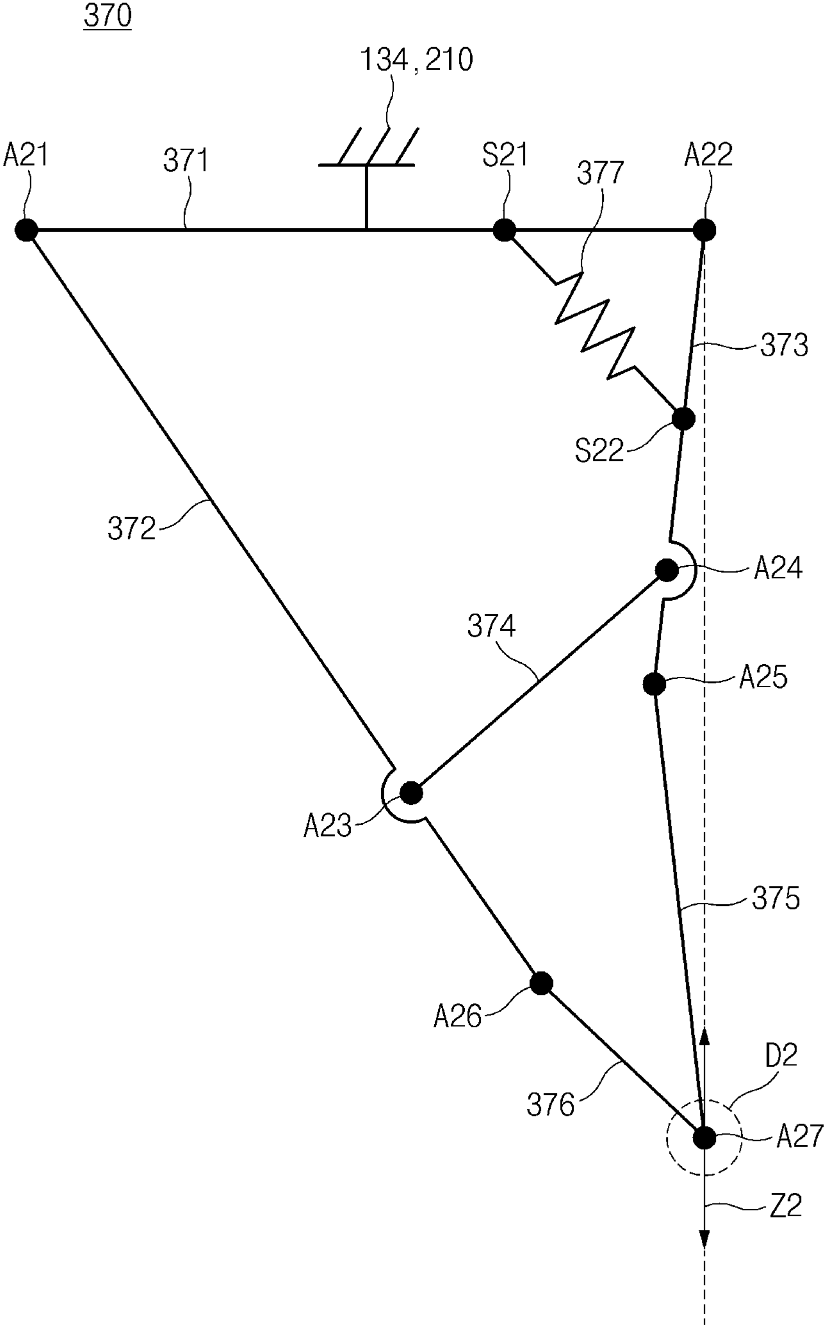
FIG. 10 is a view schematically illustrating a first example of a second link structure of the finger part of FIG. 8.

FIG. 8 is a side view illustrating the finger body part of the gripper according to embodiments of the present disclosure. FIG. 9 is a view schematically illustrating a first link structure of the finger part of FIG. 8. FIG. 10 is a view schematically illustrating a first example of a second link structure of the finger part of FIG. 8.

The finger part 300 provided in the gripper 10 of embodiments of the present disclosure may be a configuration for simulating a movement of a finger of a person. Referring to FIGS. 1 to 3, a plurality of finger parts 300 may be provided. For example, when one body part 100, one first finger base part 200-1, and one second finger base part 200-2 are provided in the gripper 10, the above-described finger part may be provided in the body part 100, the first finger base part 200-1, and the second finger base part 200-2, respectively. Contents on the finger part 300, which will be described below, may be applied to all of the finger parts provided in the body part 100, the first finger base part 200-1, and the second finger base part 200-2 in the same way.

The finger part 300 may include a first link structure 340 and a second link structure 370, sides of which are coupled to the finger base part 200, respectively.

Then, a partial area of the first link structure 340 and a partial area of the second link structure 370 may have a link structure by which they reciprocate along a specific determined locus. In more detail, the first link structure 340 and the second link structure 370 may be configured such that one area (hereinafter, 'a first support area D1') of the first link structure 340 and one area (hereinafter, 'a second support area D2') of the second link structure 370 reciprocate in only one of directions that cross a direction (a horizontal direction with reference to FIGS. 1 to 3), in which the finger part 300 reciprocates with respect to the finger base part 200. That is, according to embodiments of the present disclosure, because the first link structure 340 and the second link structure 370 are configured such that the first support area D1 and the second support area D2 repeatedly reciprocate along specific loci, an object may be effectively gripped regardless of an inclination of a ground surface on which the object is positioned, and the first support area D1 and the second support area D2 may be moved in a direction in which the finger part 300 grips the object more strongly when the gripped object applies a force to the first link structure 340 and the second link structure 370.

The first link structure 340 and the second link structure 370 provided in the finger parts 300, respectively, may have a structure in which a direction in which the first support area D1 may reciprocate and a direction in which the second support area D2 may reciprocate are parallel to each other. In more detail, a first locus section Z1 that is a set of points at which the first support area D1 may be located and a second locus section Z2 that is a set of points at which the second support area D2 may be located may correspond to line shapes, respectively. That is, the first support area D1 and the second support area D2 may have a structure that may be translated. In more detail, as illustrated in FIGS. 8 to 10, a first extension line that is an imaginary line obtained by extending the first locus section Z1 along a lengthwise direction of the first locus section Z1 and a second extension line that is an imaginary line obtained by extending the second locus section Z2 along a lengthwise direction of the second locus section Z2 may correspond to each other or may be substantially the same.

Hereinafter, a detailed configuration of the first link structure 340 will be described.

The first link structure 340 may include a (1-1)-th link 341 that is fixedly coupled to one side of the finger base part 200, and the second link structure 370 may include a (2-1)-th link 371 that is fixedly coupled to one side of the finger base part 200. The (1-1)-th link 341 and the (2-1)-th link 371 may be fixed relatively to each other. As an example, both of the (1-1)-th link 341 and the (2-1)-th link 371 may be fixedly coupled to the finger mount members 134 and 210 of the finger base part 200. Furthermore, the (1-1)-th link 341 and the (2-1)-th link 371 may be integrally formed. This may be understood that the first link structure 340 and the second link structure 370 share the (1-1)-th link 341 and the (2-1)-th link 371.

Meanwhile, the first link structure 340 may further include a first link module that is coupled to the (1-1)-th link 341 to be rotatable about a (1-1)-th rotation axis A11 and a (1-2)-th rotation axis A12, and a first elastic member 347, one side S11 of which is coupled to the (1-1)-th link 341 and an opposite side S12 of which is coupled to the first link module. The first elastic member 347 may be a configuration for restoring the first link structure 340 to an original shape when an external force applied to the first link structure 340 is eliminated. In more detail, the first elastic member 347 may press the first link module in a direction in which the first support area D1 becomes farther from the (1-1)-th link 341. This may be understood that the first elastic member 347 presses the first link module in a direction in which the first link structure 340 is spread out as a whole.

Furthermore, the second link structure 370 may further include a second link module that is coupled to the (2-1)-th link 371 to be rotatable about a (2-1)-th rotation axis A21 and a (2-2)-th rotation axis A22, and a second elastic member 377, one side S21 of which is coupled to the (2-1)-th link 371 and an opposite side S22 of which is coupled to the second link module. Similarly to the first elastic member 347, the second elastic member 377 may be a configuration for restoring the second link structure 370 to an original shape when an external force applied to the second link structure 370 is eliminated. In more detail, the second elastic member 377 may press the second link module in a direction in which the second support area D2 becomes farther from the (2-1)-th link 371. This may be understood that the second elastic member 377 presses the second link module in a direction in which the second link structure 370 is spread out as a whole. Hereinafter, referring to FIGS. 8 to 10, the first link module and the second link module will be described in detail.

The first link module may include a (1-2)-th link 342 that is coupled to the (1-1)-th link 341 to be rotatable about the (1-1)-th rotation axis A11, and a (1-3)-th link 343 that is coupled to the (1-1)-th link 341 to be rotatable about the (1-2)-th rotation axis A12. Then, the opposite side S12 of the first elastic member 347 may be coupled to the (1-3)-th link 343.

Furthermore, the first link module may further include a (1-4)-th link 344 that is coupled to the (1-2)-th link 342 to be rotatable about a (1-3)-th rotation axis A13 and is coupled to the (1-3)-th link 343 to be rotatable about a (1-4)-th rotation axis A14, and a (1-5)-th link 354 that is coupled to the (1-3)-th link 343 to be rotatable about a (1-5)-th rotation axis A15.

Then, a distance between the (1-2)-th rotation axis A12 and the (1-4)-th rotation axis A14 may be smaller than a distance between the (1-2)-th rotation axis A12 and the (1-5)-th rotation axis A15, and a distance between the (1-3)-th rotation axis A13 and the (1-5)-th rotation axis A15 may be smaller than a distance between the (1-3)-th rotation axis A13 and the (1-4)-th rotation axis A14.

In addition, the first link module may further include a (1-6)-th link 346 that is coupled to the (1-2)-th link 342 to be rotatable about a (1-6)-th rotation axis A16 and is coupled to a (1-5)-th link 345 to be rotatable about a (1-7)-th rotation axis A17. Then, the first support area D1 may be formed on the (1-7)-th rotation axis A17. That is, the (1-7)-th rotation axis A17 may be moved along the first locus section Z1.

Meanwhile, as illustrated in FIGS. 8 and 9, the first link structure 340 may have a shape in which the (1-2)-th rotation axis A12, the (1-3)-th rotation axis A13, and the (1-4)-th rotation axis A14 are disposed on a straight line when the (1-2)-th link 342 and the (1-5)-th link 345 are parallel to each other. More preferably, the first link structure 340 may have a shape in which the (1-2)-th rotation axis A12, the (1-3)-th rotation axis A13, the (1-4)-th rotation axis A14, and the (1-5)-th rotation axis A15 are disposed on a straight line when the (1-2)-th link 342 and the (1-5)-th link 345 are parallel to each other.

In addition, as illustrated in FIGS. 8 and 9, the first link structure 340 may include a first triangular area having a triangular shape when the (1-2)-th rotation axis A12, the (1-3)-th rotation axis A13, the (1-4)-th rotation axis A14, and the (1-5)-th rotation axis A15 are on a straight line. Then, in the first triangular area, the (1-1)-th link 341 may be a first side, the (1-2)-th link 342 may be a second side, and the (1-3)-th link 343 and the (1-4)-th link 344 may be a third side.

Meanwhile, according to an embodiment of the present disclosure, the first link structure 340 may be configured such that imaginary lines obtained by extending the (1-2)-th rotation axis A12 and the (1-7)-th rotation axis A17 are always perpendicular to a lengthwise direction of the (1-1)-th link 341. Then, because the first support area D1 may be formed on the (1-7)-th rotation axis A17, it may be understood in the above-described contents that the first locus section Z1 of the first support area D1 is formed perpendicularly to the (1-1)-th link 341.

Meanwhile, as illustrated in FIGS. 8 and 10, the second link module may include a (2-2)-th link 372 that is coupled to the (2-1)-th link 371 to be rotatable about the (2-1)-th rotation axis A21, and a (2-3)-th link 373 that is coupled to the (2-1)-th link 371 to be rotatable about the (2-2)-th rotation axis A22. Then, the opposite side S22 of the second elastic member 377 may be coupled to the (2-3)-th link 373.

Furthermore, the second link module may further include a (2-4)-th link 374 that is coupled to the (2-2)-th link 372 to be rotatable about a (2-3)-th rotation axis A23 and is coupled to the (2-3)-th link 373 to be rotatable about a (2-4)-th rotation axis A24, and a (2-5)-th link 375 that is coupled to the (2-3)-th link 373 to be rotatable about a (2-5)-th rotation axis A25.

Then, a distance between the (2-2)-th rotation axis A22 and the (2-4)-th rotation axis A24 may be smaller than a distance between the (2-2)-th rotation axis A22 and the (2-5)-th rotation axis A25.

In addition, the second link module may further include a (2-6)-th link 376 that is coupled to the (2-2)-th link 372 to be rotatable about a (2-6)-th rotation axis A26 and is coupled to the (2-5)-th link 375 to be rotatable about a (2-7)-th rotation axis A27. Then, the second support area D2 may be formed on the (2-7)-th rotation axis A27. That is, the (2-7)-th rotation axis A27 may be moved along the second locus section Z2.

Furthermore, as illustrated in FIGS. 8 and 10, a distance between the (2-1)-th rotation axis A21 and the (2-3)-th rotation axis A23 may be smaller than the (2-1)-th rotation axis A21 and the (2-6)-th rotation axis A26.

Meanwhile, according to an embodiment of the present disclosure, the second link structure 370 may be configured to such that imaginary lines obtained by extending the (2-2)-th rotation axis A22 and the (2-7)-th rotation axis A27 are always perpendicular to a lengthwise direction of the (2-1)-th link 371. Then, because the second support area D2 may be formed on the (2-7)-th rotation axis A27, it may be understood in the above-described contents that the second locus section Z2 of the second support area D2 is formed perpendicularly to the (2-1)-th link 371.

In addition, as illustrated in FIGS. 8 and 10, the (2-3)-th link 373 and the (2-5)-th link 375 may form a specific angle while the external force is eliminated. That is, the second link structure 370 may be configured such that an area in which the (2-3)-th link 373 and the (2-5)-th link 375 meet each other, has a shape that is recessed toward the (2-4)-th link 374 with respect to an imaginary line obtained by connecting the (2-2)-th rotation axis A22 and the (2-7)-th rotation axis A27. Furthermore, the second link structure 370 may be configured such that the (2-4)-th rotation axis A24 and the (2-5)-th rotation axis A25 have shapes that are biased toward the (2-4)-th link 374 with respect to an imaginary line obtained by connecting the (2-2)-th rotation axis A22 and the (2-7)-th rotation axis A27. This may be understood that the second link structure 370 includes a second triangular area having a substantially triangular shape while the external force is eliminated and one side of the second triangular area, which is formed by the (2-3)-th link 373 and the (2-5)-th link 375, has a shape that is recessed inwards.

Meanwhile, as illustrated in FIG. 8, the finger part 300 may further include a grip member 400, one side of which is coupled to the (1-7)-th rotation axis A17 to be rotatable and an opposite side of which is coupled to the (2-7)-th rotation axis A27 to be rotatable. The grip member 400 may be not only a configuration for pressing an object when the gripper 10 grips the object, but also a configuration that functions to support the object such that the object is prevented from dropping downwards when the object is located on an upper side of the grip member 400 with reference to FIG. 8. As an example, an outer surface (a right surface with reference to FIG. 8) of the grip member 400 may have a flat shape.

Figure 11:
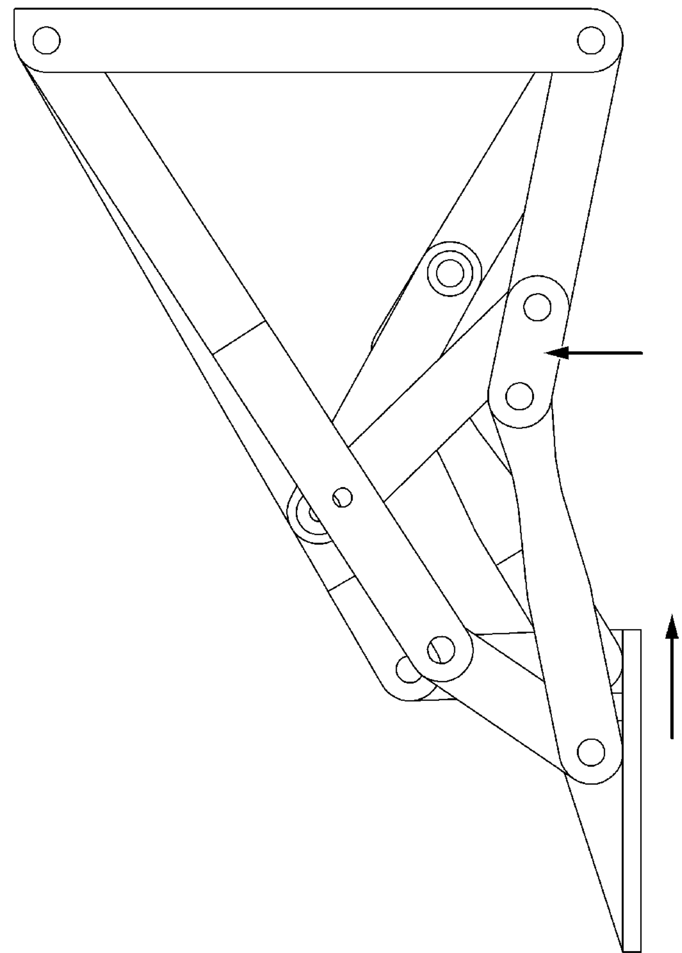
FIG. 11 is a view illustrating a state in which a length of a finger part is prolonged as an external force is applied, according to embodiments of the present disclosure.
Figure 12:
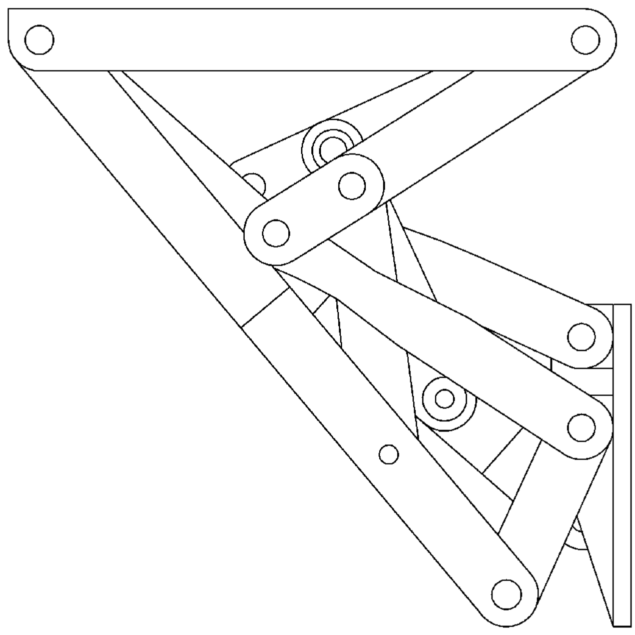
FIG. 12 is a view illustrating a state in which a length of a finger part is contracted as an external force is applied, according to embodiments of the present disclosure.

FIG. 11 is a view illustrating a state in which a length of the finger part is prolonged as an external force is applied, according to embodiments of the present disclosure. FIG. 12 is a view illustrating a state in which a length of the finger part is contracted as an external force is applied, according to embodiments of the present disclosure.

Referring to FIGS. 8 to 12, in a process of gripping the object through the finger part 300, the (1-3)-th link 343, the (1-5)-th link 345, the (2-3)-th link 373, the (2-5)-th link 375, and/or the grip member 400 may be configured to face the object. Accordingly, in the process of gripping the object, the (1-3)-th link 343, the (1-5)-th link 345, the (2-3)-th link 373, the (2-5)-th link 375, and/or the grip member 400 may be pressed.

Then, in the process of gripping the object, the (1-3)-th link 343, the (1-5)-th link 345, the (2-3)-th link 373, the (2-5)-th link 375, and/or the grip member 400 may be pressed leftwards with reference to FIGS. 8 to 12 while pressing the object. Then, due to the link structure of the first link structure 340 and the second link structure 370, the (1-7)-th rotation axis A17 and the (2-7)-th rotation axis A27 are moved upwards and the shape of the finger part is changed from that of FIG. 11 to that of FIG. 12. Meanwhile, because the external force by the object is eliminated when the object is spaced apart from the finger part 300, the shape of the finger part 300 is changed from that of FIG. 12 to that of FIG. 11 again by restoring forces of the first elastic member and the second elastic member. Accordingly, according to embodiments of the present disclosure, in the process of gripping the object through the finger part 300, the first link structure 340 and the second link structure 370 may be deformed to shapes by which the object may be effectively gripped.

Furthermore, in the process of gripping the object through the finger part 300, not only the object but also the ground surface on which the object is positioned may press the finger part 300. In more detail, the ground surface presses the grip member 400 upwards, and thus, the shape of the finger part 300 also is changed from that of FIG. 11 to that of FIG. 12. Thereafter, when the force by the ground surface is eliminated, the shape of the finger part 300 is changed from that of FIG. 12 to that of FIG. 11 again by the restoring forces of the first elastic member and the second elastic member. Accordingly, according to embodiments of the present disclosure, according to a force applied to the finger part 300 by the ground surface, the shapes of the first link structure 340 and the second link structure 370 may be flexibly deformed.

Hereinafter, another example of the shape of the second link structure 370 also will be described.

Figure 13:
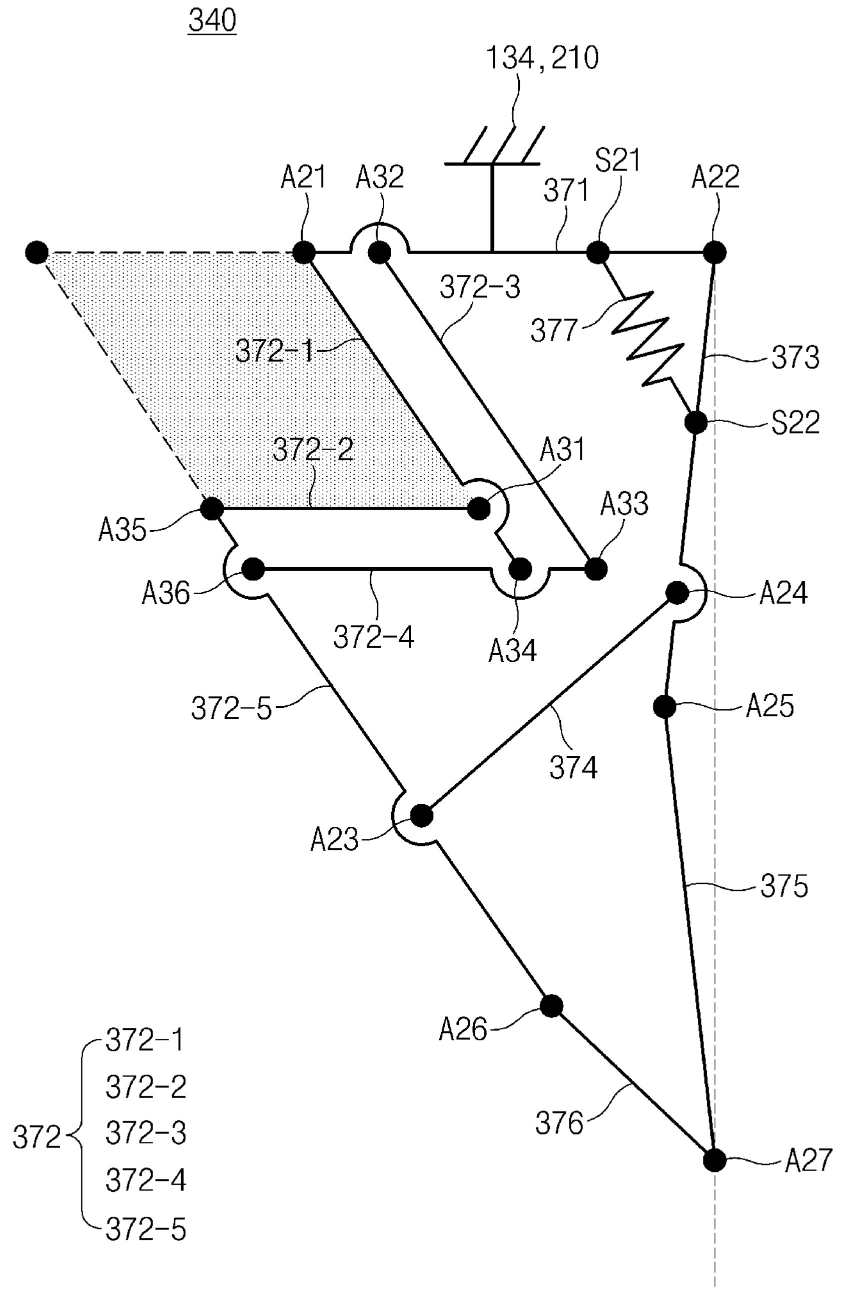
FIG. 13 is a view schematically illustrating a second example of a second link structure of a finger part according to embodiments of the present disclosure.
Figure 14:
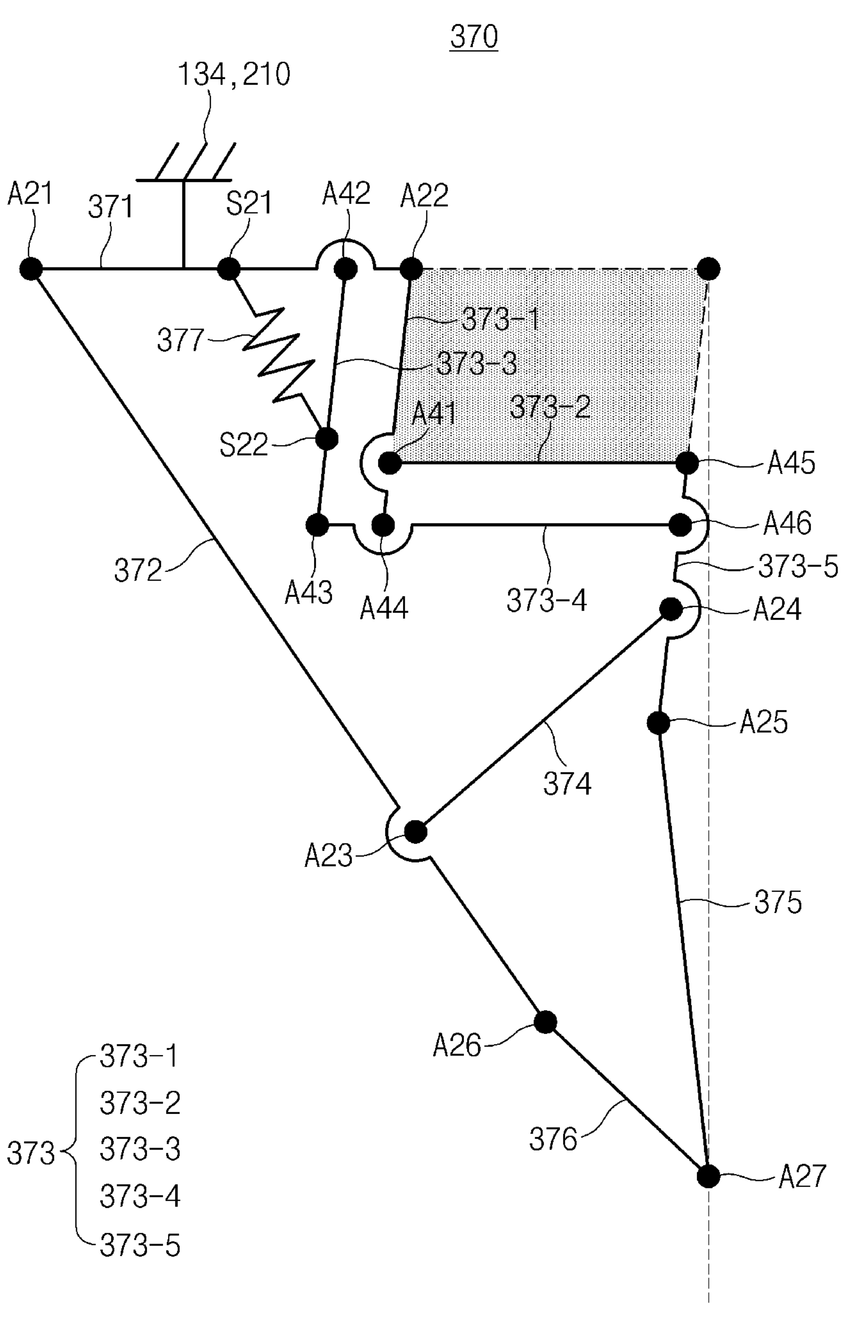
FIG. 14 is a view schematically illustrating a third example of a second link structure of a finger part according to embodiments of the present disclosure.

FIG. 13 is a view schematically illustrating a second example of the second link structure of the finger part according to embodiments of the present disclosure. FIG. 14 is a view schematically illustrating a third example of the second link structure of the finger part according to embodiments of the present disclosure.

The contents described above regarding the second link structure may be directly applied to the second example and the third example of the second link structure. However, unlike the first example, the second example and the third example of the second link structure are different from the first example of the second link structure in that a plurality of (2-2)-th links 372 or a plurality of (2-3)-th links 373 that are rotatable may be provided. Hereinafter, differences of the second example and the third example of the second link structure from the first example of the second link structure will be mainly described. The contents other than the contents that will be described below are replaced by the contents described above in the first example.

Referring to FIG. 13, the (2-2)-th link 372 according to the second example of the second link structure 370 may further include a (2-2-1)-th link member 372-1 that is coupled to the (2-1)-th link 371 to be rotatable about the (2-1)-th rotation axis A21, a (2-2-2)-th link member 372-2 that is coupled to the (2-2-1)-th link member 372-1 to be rotatable about a (3-1)-th rotation axis A31, a (2-2-3)-th link member 372-3 that is coupled to the (2-1)-th link 371 to be rotatable about a (3-2)-th rotation axis A32, a (2-2-4)-th link member 372-4 that is coupled to the (2-2-3)-th link member 372-3 to be rotatable about a (3-3)-th rotation axis A33 and coupled to the (2-2-1)-th link member 372-1 to be rotatable about a (3-4)-th rotation axis A34, and a (2-2-5)-th link member 372-5 that is coupled to the (2-2-2)-th link member 372-2 to be rotatable about the (3-5)-th rotation axis A35 and coupled to the (2-2-4)-th link member 372-4 to be rotatable about a (3-6)-th rotation axis A36.

Then, according to the second example, the (2-2-1)-th link member 372-1 and the (2-2-3)-th link member 372-3 may be provided in parallel to each other, and the (2-2-2)-th link member 372-2 and the (2-2-4)-th link member 372-4 may be provided in parallel to each other.

Furthermore, a distance between the (2-2)-th rotation axis A22 and the (3-2)-th rotation axis A32 may be smaller than a distance between the (2-2)-th rotation axis A22 and the (2-1)-th rotation axis A21, and a distance between the (2-3)-th rotation axis A23 and the (3-6)-th rotation axis A36 may be smaller than a distance between the (2-3)-th rotation axis A23 and the (3-5)-th rotation axis A35.

As illustrated in FIG. 13, according to the second example of the second link structure, as compared with the first example of the second link structure, a space occupied by the (2-2)-th link 372 may be reduced (see shading of FIG. 13). Accordingly, a size of the gripper 10 may be effectively reduced.

Meanwhile, referring to FIG. 14, the (2-3)-th link 373 according to the second example of the second link structure 370 may include a (2-3-1)-th link member 373-1 that is coupled to the (2-1)-th link 371 to be rotatable about the (2-2)-th rotation axis A22, a (2-3-2)-th link member 373-2 that is coupled to the (2-3-1)-th link member 373-1 to be rotatable about a (4-1)-th rotation axis A41, a (2-3-3)-th link member 373-3 that is coupled to the (2-1)-th link 371 to be rotatable about a (4-2)-th rotation axis A42, a (2-3-4)-th link member 373-4 that is coupled to the (2-3-3)-th link member 373-3 to be rotatable about a (4-3)-th rotation axis A43 and coupled to the (2-3-1)-th link member 373-1 to be rotatable about a (4-4)-th rotation axis A44, and a (2-3-5)-th link member 373-5 that is coupled to the (2-2-3)-th link member 373-2 to be rotatable about a (4-5)-th rotation axis A45 and coupled to the (2-3-4)-th link member 373-4 to be rotatable about a (4-6)-th rotation axis A46.

Then, according to the third example, the (2-3-1)-th link member 373-1 and the (2-3-3)-th link member 373-3 may be provided in parallel to each other, and the (2-3-2)-th link member 373-2 and the (2-3-4)-th link member 373-4 may be provided in parallel to each other.

Furthermore, a distance between the (2-1)-th rotation axis A21 and the (4-2)-th rotation axis A42 may be smaller than a distance between the (2-1)-th rotation axis A21 and the (2-2)-th rotation axis A22, and a distance between the (2-4)-th rotation axis A24 and the (4-6)-th rotation axis A46 may be smaller than a distance between the (2-4)-th rotation axis A24 and the (4-5)-th rotation axis A45.

Meanwhile, according to the third example, the opposite side S22 of the second elastic member 377 may be coupled to the (2-3-3)-th link member 373-3.

As illustrated in FIG. 14, according to the third example of the second link structure, as compared with the first example of the second link structure, a space occupied by the (2-3)-th link 373 may be reduced (see shading of FIG. 14). Accordingly, a size of the gripper 10 may be effectively reduced.

Meanwhile, the above-described grip member 400 may be configured to be attached to or detached from the first link structure 340 and the second link structure 370. In this case, according to the size and the shape of the object that is to be gripped, the grip member 400 may be easily attached and detached. Furthermore, the detachable grip member also may be provided on side surfaces of the (1-3)-th link 343, the (1-5)-th link 345, the (2-3)-th link 373, and the (2-5)-th link 375.

Meanwhile, the rotation axes A11, A12, A13, A14, A15, A16, A17, A21, A22, A23, A24, A25, A26, A27, A31, A32, A33, A34, A35, A36, A41, A42, A43, A44, A45, and A46 mentioned in the specification may be parallel to each other.

According to embodiments of the present disclosure, the gripper not only may achieve a light weight and a small size by reducing the number of motors mounted on the gripper but also may grip an object in various postures.

Although it is apparent that the present disclosure has been described with reference to the limited embodiments and the drawings, the present disclosure is not limited thereto, and the present disclosure may be variously carried out by an ordinary person in the art within the technical spirit of the present disclosure and the equivalent ranges of the claims.

What is claimed is:

1. A gripper comprising:
a body part;
a finger base part coupled to the body part to be rotatable, the finger base part comprising a first finger base part and a second finger base part configured such that when the first finger base part is rotated in a first direction with respect to the body part, the second finger base part is provided to be rotatable in a second direction opposite the first direction with respect to the body part; and
a finger part coupled to a first side of the body part or the finger base part to be reciprocal, wherein the finger part comprises:
a first finger part coupled to the body part; and
a second finger part coupled to the finger base part, the second finger part being configured such that the second finger part is moved toward an area in which the finger base part is coupled to the body part when the first finger part is moved toward the area, and the second finger part is moved toward the area when the first finger part is moved to become farther from the area.

2. The gripper of claim 1, wherein:
the body part comprises:
a first motor configured to rotate a first rotary shaft;
an input bevel gear coupled to the first rotary shaft; and
an output bevel gear engaged with the input bevel gear, wherein the output bevel gear comprises:
a first output bevel gear engaged with a first area of the input bevel gear; and
a second output bevel gear engaged to a second area opposite the first area of the input bevel gear in a state in which the second output bevel gear faces the first output bevel gear while the input bevel gear is interposed therebetween, the first finger base part is rotatable in conjunction with rotation of the first output bevel gear; and
the second finger base part is rotatable in conjunction with rotation of the second output bevel gear.

3. The gripper of claim 2, wherein:
the body part further comprises a coupler link having an interior space in which the output bevel gear is fixedly coupled,
the coupler link comprises:
a first coupler link to which the first output bevel gear is fixedly coupled; and
a second coupler link to which the second output bevel gear is fixedly coupled;
the first finger base part is coupled to the first coupler link; and
the second finger base part is coupled to the second coupler link.

4. The gripper of claim 2, wherein:
the body part further comprises:
a second motor configured to rotate a second rotary shaft;
a central gear rotatable in conjunction with the second rotary shaft; and
a peripheral gear engaged with the central gear,
the first finger part is coupled to be reciprocal with respect to the body part;
the second finger part is coupled to be reciprocal with respect to the finger base part; and the first finger part and the second finger part are configured to receive power from the peripheral gear to be reciprocal.

5. The gripper of claim 4, wherein the peripheral gear comprises:

a first peripheral gear configured to receive power from the central gear and transmit the power to the first finger part; and a second peripheral gear configured to receive power from the central gear and transmit the power to the second finger part.

6. The gripper of claim 5, wherein the body part further comprises:

a first pulley member coupled to be rotatable together with the first peripheral gear;

a first belt member surrounding an outer side of the first pulley member and configured to receive power from the first pulley member to be movable; and a first finger mount member fixedly coupled to one side of the first belt member, wherein the first finger part is fixedly coupled to the first finger mount member.

7. The gripper of claim 6, wherein:

the body part further comprises a second pulley member coupled to be rotatable together with the second peripheral gear; and the finger base part comprises:

a second belt member surrounding an outer side of the second pulley member and configured to receive power from the second pulley member to be movable; and a second finger mount member fixedly coupled to one side of the second belt member, wherein the second finger part is fixedly coupled to the second finger mount member.

8. The gripper of claim 7, wherein the finger base part further comprises a third pulley member spaced apart from the second pulley member, the third pulley member being rotatable and being configured such that the second belt member surrounds an outer side thereof.

9. The gripper of claim 8, wherein the finger base part further comprises:

a base frame member on one side of the third pulley member;

a second rail member fixedly coupled to one surface of the base frame member; and a second guide member configured to be movable along a lengthwise direction of the second rail member and to which the second finger mount member is fixedly coupled.

10. The gripper of claim 7, wherein:

the second finger mount member comprises:

a fixing area through which the second belt member passes and to which the second belt member is fixed relatively with respect to the second finger mount member; and a through area through which the second belt member passes and in which the second belt member is provided to be movable with respect to the second finger mount member;

the second belt member has a closed curve shape; and the fixing area and the through area face each other while being spaced apart from each other by a radius of the second pulley member.

11. The gripper of claim 10, wherein:

the finger base part further comprises a clamp member configured to fix the second belt member to the fixing area, the clamp member comprising:

an inner clamp fixedly coupled to the second finger mount member on an inside of the fixing area; and an outer clamp fixedly coupled to the second finger mount member on an outside of the fixing area and facing the inner clamp while the second belt member is interposed therebetween.

12. The gripper of claim 6, wherein the body part further comprises a third pulley member spaced apart from the first pulley member, the third pulley member being rotatable and being configured such that the first belt member surrounds an outer side thereof.

13. The gripper of claim 6, wherein:

the first finger mount member comprises:

a fixing area through which the first belt member passes and to which the first belt member is fixed relatively; and a through area through which the first belt member passes and in which the first belt member is provided to be movable with respect to the first finger mount member;

the first belt member has a closed curve shape; and the fixing area and the through area face each other while being spaced apart from each other by a radius of the first pulley member.

14. A gripper comprising:

a body part;

a finger base part coupled to the body part to be rotatable, the finger base part comprising a first finger base part and a second finger base part configured such that when the first finger base part is rotated in a first direction with respect to the body part, the second finger base part is provided to be rotatable in a second direction opposite the first direction with respect to the body part; and a finger part coupled to a first side of the body part or the finger base part to be reciprocal;

wherein the finger part comprises a first finger part coupled to the body part and a second finger part coupled to the finger base part, the second finger part being configured such that the second finger part is moved toward an area in which the finger base part is coupled to the body part when the first finger part is moved toward the area, and the second finger part is moved toward the area when the first finger part is moved to become farther from the area;

wherein the body part comprises a first motor configured to rotate a first rotary shaft, an input bevel gear coupled to the first rotary shaft, and an output bevel gear engaged with the input bevel gear;

wherein the output bevel gear comprises a first output bevel gear engaged with a first area of the input bevel gear, and a second output bevel gear engaged to a second area opposite the first area of the input bevel gear in a state in which the second output bevel gear faces the first output bevel gear while the input bevel gear is interposed therebetween;

wherein the first finger base part is rotatable in conjunction with rotation of the first output bevel gear;

wherein the second finger base part is rotatable in conjunction with rotation of the second output bevel gear;

wherein the body part further comprises a second motor configured to rotate a second rotary shaft, a central gear rotatable in conjunction with the second rotary shaft, and a peripheral gear engaged with the central gear;

wherein the first finger part is coupled to be reciprocal with respect to the body part;

wherein the second finger part is coupled to be reciprocal with respect to the finger base part;

wherein the first finger part and the second finger part are configured to receive power from the peripheral gear to be reciprocal;

wherein the peripheral gear comprises a first peripheral gear configured to receive power from the central gear and transmit the power to the first finger part, and a second peripheral gear configured to receive power from the central gear and transmit the power to the second finger part;

wherein the body part further comprises a first pulley member coupled to be rotatable together with the first peripheral gear, a first belt member surrounding an outer side of the first pulley member and configured to receive power from the first pulley member to be movable, and a first finger mount member fixedly coupled to one side of the first belt member, wherein the first finger part is fixedly coupled to the first finger mount member; and wherein the body part further comprises a body frame member on one side of the first motor, a first rail member fixedly coupled to one surface of the body frame member, and a first guide member configured to be movable along a lengthwise direction of the first rail member and to which the first finger mount member is fixedly coupled.

15. The gripper of claim 14, wherein:

the body part further comprises a body-side gear fixed to an area of the body frame member that faces the finger base part;

the finger base part further comprises:

a base frame member having at least a partial area facing the body-side gear; and a base-side gear fixed to an area of the base frame member that faces the body part; and the body-side gear and the base-side gear are engaged with each other.

16. The gripper of claim 15, wherein a central rotation axis of the body-side gear and a central rotation axis of the central gear correspond to each other.

17. The gripper of claim 16, wherein a size of a pitch circle of the body-side gear and a size of a pitch circle of the central gear correspond to each other.

18. The gripper of claim 15, wherein a central rotation axis of the base-side gear and a central rotation axis of the peripheral gear correspond to each other.

19. The gripper of claim 18, wherein a size of a pitch circle of the base-side gear and a size of a pitch circle of the peripheral gear correspond to each other.

20. A gripper comprising:

a body part;

a finger base part coupled to the body part to be rotatable, the finger base part comprising a first finger base part and a second finger base part configured such that when the first finger base part is rotated in a first direction with respect to the body part, the second finger base part is provided to be rotatable in a second direction opposite the first direction with respect to the body part; and a finger part coupled to a first side of the body part or the finger base part to be reciprocal;

wherein the finger part comprises:

a first finger part coupled to the body part; and a second finger part coupled to the finger base part, the second finger part being configured such that the second finger part is moved toward an area in which the finger base part is coupled to the body part when the first finger part is moved toward the area, and the second finger part is moved toward the area when the first finger part is moved to become farther from the area; and wherein the body part comprises:

a first motor configured to rotate a first rotary shaft;

an input bevel gear coupled to the first rotary shaft; and an output bevel gear engaged with the input bevel gear.

* * * * *